US011068783B2

(12) United States Patent
Milman et al.

(10) Patent No.: US 11,068,783 B2
(45) Date of Patent: Jul. 20, 2021

(54) SYSTEMS AND METHODS FOR MANAGING INTERACTION INVITATIONS

(71) Applicant: LIVEPERSON, INC., New York, NY (US)

(72) Inventors: Vadim Milman, Tel Aviv (IL); Itamar Keller, Tel Aviv (IL); Shachar Hendel, Tel Aviv (IL); Tomer Ben-David, Tel Aviv (IL); Amihay Zer-Kavod, Tel Aviv (IL); Yariv Lukach, Tel Aviv (IL); Leor Gruendlinger, Tel Aviv (IL); Ofer Ron, Tel Aviv (IL); Shlomo Lahav, Tel Aviv (IL)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 16/993,125

(22) Filed: Aug. 13, 2020

(65) Prior Publication Data

US 2021/0049466 A1 Feb. 18, 2021

Related U.S. Application Data

(60) Provisional application No. 62/886,647, filed on Aug. 14, 2019.

(51) Int. Cl.
*G06N 3/08* (2006.01)
*G06N 3/04* (2006.01)
*H04L 12/58* (2006.01)

(52) U.S. Cl.
CPC ............. *G06N 3/08* (2013.01); *G06N 3/0454* (2013.01); *H04L 51/02* (2013.01); *H04L 51/16* (2013.01)

(58) Field of Classification Search
CPC ........ G06N 20/00; G06N 7/005; G06N 20/20; G06N 5/003; G06N 3/08; G06N 3/0454; H04M 3/5175; H04M 3/5183; H04M 3/5233; G06F 16/337; G06F 16/958; H04L 12/66; H04L 29/06; H04L 43/16;
(Continued)

(56) References Cited

U.S. PATENT DOCUMENTS 8,126,134 B1 * 2/2012 Fama .................. H04M 3/5158
379/265.01
8,391,466 B1 * 3/2013 Noble, Jr. ........... H04M 3/5158
379/266.07
(Continued)

FOREIGN PATENT DOCUMENTS

CN 108156331 A 6/2018

OTHER PUBLICATIONS

International Search Report and Written Opinion for PCT Application No. PCT/US2020/046236 dated Nov. 20, 2020, 10 pages.

*Primary Examiner* — Ninos Donabed
(74) *Attorney, Agent, or Firm* — Polsinelli LLP

(57) ABSTRACT

The present disclosure relates generally to facilitating routing of communications. One example includes a communication server determining capacities associated with a terminal devices based on workloads for agents associated with the terminal devices. Historical acceptance data is accessed for past interaction invitations to user devices associated with one or more criteria. Current data is then used to determine available interactions and to facilitate interactions using interaction invitations based on the historical data and the current number of available interactions.

15 Claims, 15 Drawing Sheets

(58) Field of Classification Search
CPC ..... H04L 67/02; H04L 67/1008; H04L 51/02; H04L 51/16
See application file for complete search history.

(56) References Cited

U.S. PATENT DOCUMENTS

| | | | |
|---|---|---|---|
| 9,723,144 B1* | 8/2017 | Gao | H04M 3/5238 |
| 2006/0062376 A1* | 3/2006 | Pickford | H04M 3/5235 |
| | | | 379/265.12 |
| 2006/0262922 A1* | 11/2006 | Margulies | G06Q 30/02 |
| | | | 379/265.12 |
| 2007/0038499 A1* | 2/2007 | Margulies | G06Q 10/06316 |
| | | | 705/7.26 |
| 2007/0038610 A1* | 2/2007 | Omoigui | H04L 67/02 |
| 2010/0002863 A1* | 1/2010 | Loftus | H04M 3/5158 |
| | | | 379/265.02 |
| 2010/0070448 A1* | 3/2010 | Omoigui | H01L 27/14647 |
| | | | 706/47 |
| 2013/0346550 A1* | 12/2013 | Higgins | G06K 9/00281 |
| | | | 709/217 |
| 2016/0202960 A1* | 7/2016 | Minh Le | G06F 8/40 |
| | | | 717/158 |
| 2017/0064080 A1* | 3/2017 | Chishti | H04M 3/5234 |
| 2017/0064081 A1* | 3/2017 | Chishti | H04M 3/5232 |
| 2018/0234550 A1* | 8/2018 | Lifson | H04M 7/006 |
| 2019/0028592 A1* | 1/2019 | Suzuki | H04M 3/58 |

* cited by examiner

SYSTEMS AND METHODS FOR MANAGING INTERACTION INVITATIONS

CROSS-REFERENCE TO RELATED APPLICATIONS

This application claims the benefit of U.S. Provisional Application No. 62/886,647, filed Aug. 14, 2019 and titled "SYSTEMS AND METHODS FOR MANAGING INTERACTION INVITATIONS" which is hereby incorporated by reference in its entirety and for all purposes.

FIELD

The present disclosure relates generally to facilitating routing of communications. More specifically, techniques are provided to automatically initiate interaction invitations, and to dynamically route invitation acceptances, such as invitations and acceptances involving a user invited to interact with an agent using artificial intelligence (AI) and machine learning techniques.

SUMMARY

Embodiments described herein related systems and methods for automatically managing interaction invitations in a communication system. In some embodiments, elements of the communication system can be considered a computer implemented predictive invitation or dialing system. Various embodiments can use history information from the communication to match terminal (e.g. agent) device capacity in the system to possible interactions that can be initiated proactively by the system with user devices that are connected to the system. In some examples, this can also involve supplemental information about the users associated with the user devices, as well as agents associated with the terminal devices having capacity. Machine learning analysis can be used in such a communication system to increase capacity utilization of terminal devices while avoiding negative user experiences (e.g., such as negative experiences where a system contacts a user device with an invitation and then has a user wait for an agent after the user accepts an invitation). Invitation interaction management described herein can use machine learning to avoid such negative results while improving system efficiencies and utilization.

One example embodiment includes a communication server determining capacities associated with a terminal devices based on workloads for agents associated with the terminal devices. Historical acceptance data is accessed for past interaction invitations to user devices associated with one or more criteria. Current data is then used to determine available interactions and to facilitate interactions using interaction invitations based on the historical data and the current number of available interactions.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure include a computer-implemented method. The method may include determining capacities associated with a plurality of terminal devices. The method may further include determining a number of available interaction invitations. The number of available interaction invitations may be determined using the capacities associated with the plurality of terminal devices. The method further comprises transmitting the available interaction invitations. The method further comprises receiving acceptance data. The acceptance data may correspond to one or more acceptances of the available interaction invitations by one or more network devices. The one or more network devices may be associated with criteria. The method further comprises using the acceptance data to determine statistical data. The statistical data is associated with a likelihood that additional network devices associated with the criteria will accept an available interaction invitation. The method further comprises determining one or more additional network devices. Determining includes using the statistical data. The one or more additional network devices are associated with the criteria. The method further comprises updating the number of available interaction invitations available for transmission to the one or more additional network devices. The number of available interaction invitations is updated according to the acceptance data.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures.

Figure 1:
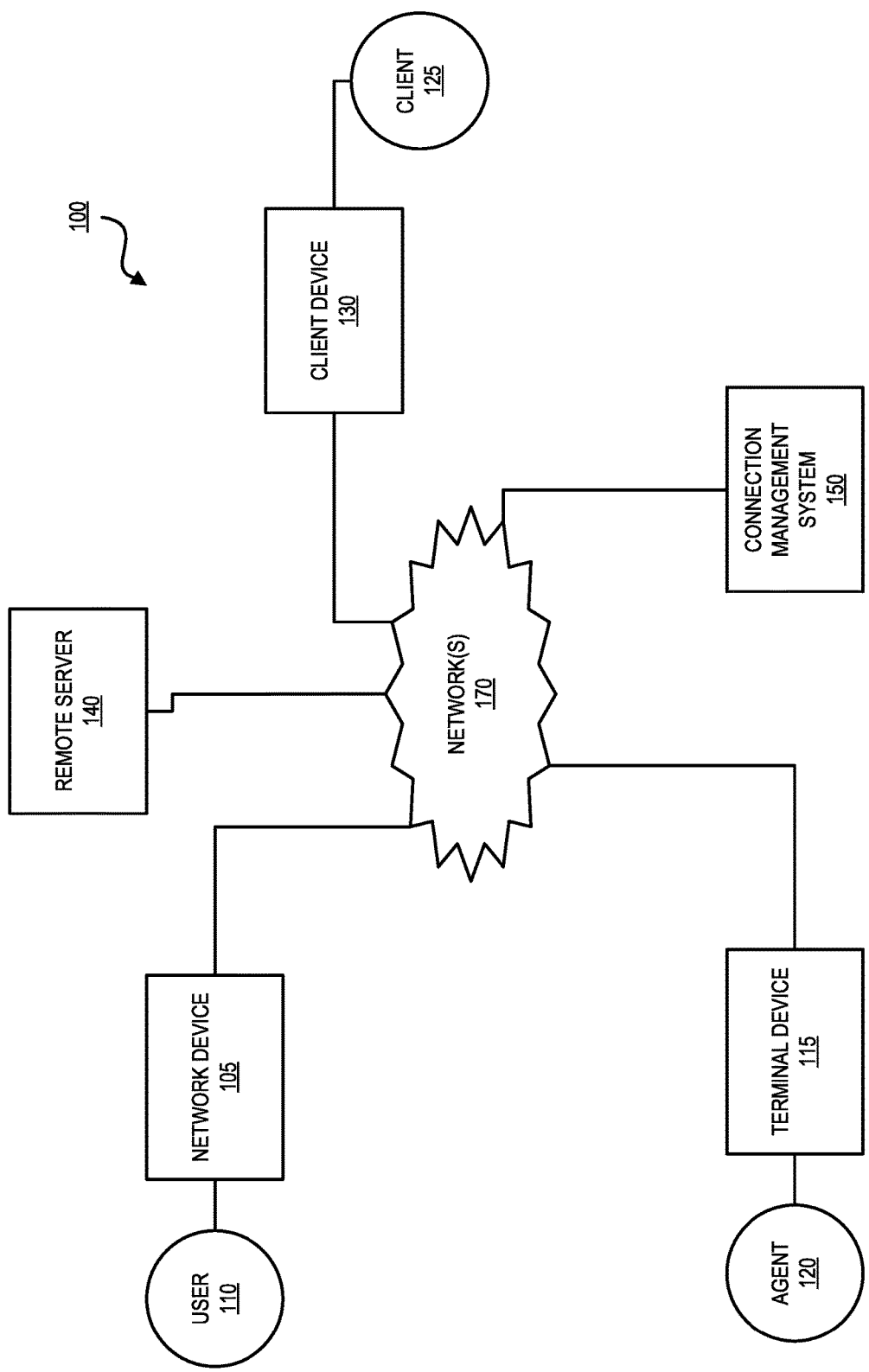
FIG. 1 shows a block diagram of an embodiment of a network interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Examples described herein relate generally to facilitating interactions between terminal devices and user devices, as well as facilitating routing of communications between matches of terminal devices and user devices when a user accepts an interaction invitation from a communication system. More specifically, techniques are provided to automatically initiate invitations, and then dynamically route invitation acceptances, such as invitations to interact with an agent using artificial intelligence (AI) and machine learning techniques.

Users and businesses connected to a network (e.g., the Internet) can have a wide variety of reasons for interacting. These reasons can include interactions based on previously initiated relationships, such as providing customer service for a previously purchased product or scheduling a meeting, as well as first-contact interactions, such as answering questions related to a potential sale of a product or service. In this context, communication systems on the network can operate to facilitate connections between users (e.g., customers or potential customers of a business) and clients of the communication system (e.g., businesses attempting to improve interactions with users).

Such a communication system can make agents available to interact with users via respective devices. Terminal devices for agents can manage the capacity of the agents to avoid overtaxing an agent, and user devices can allow users to interact with agents. In some situations, network activity by user devices can allow a communication system to determine that the user devices are connected to the network, and may be available for interactions with an agent. Such situations can include a user device browsing an online store, an application operating on a user device notifying the communication system after the user device had previously request an interaction that did not occur, or other such user device activities on a network. In some such situations, the communication network can determine that more devices are available for possible interactions than could be handled by the current capacity of the available agents. Sending invitations to all such user devices, and then either requiring the user devices to wait for an agent or simply not being able to provide a connection to an agent after the system sends an invitation has the potential for significant negative results for clients (e.g. businesses using the communication system). The negative results can include damaging user relationships, or driving users to competitors. On the other hand, failing to initiate an interaction similarly risks missing out on positive interactions and opportunities to improve relationships via interactions.

Examples described herein can use information about agent capacities, user device presence in a network, and historical acceptance rate data to match a number of expected interaction acceptance responses to the capacity of a communication system. For example, in a simple embodiment, a communication system receives information that 40 user devices are currently browsing a website, but agent terminal devices only have capacity to handle interactions with 10 user devices. Historical acceptance rate data indicating that interaction invitations are accepted 50% of the time can be used by the system to send 20 interaction invitations. After a certain period of time, the communication system can dynamically reassess the terminal device capacity and the remaining user devices that were not offered an interaction, and then automatically send additional interaction invitations according to a similar model if agent capacity is available.

In various examples, additional system machine intelligence can be used, such as prioritizing users for invitations based on system data and parameters, dynamically matching user acceptances to particular terminal devices based on system parameters, or other such automation. The examples described herein can improve capacity utilization of terminal devices and agents in a communication system, while maintaining performance thresholds associated with user interactions and network use via the communication system.

The ensuing description provides examples of embodiments and is not intended to limit the scope, applicability or configuration of the disclosure. Rather, the ensuing description of the examples of embodiments will provide those skilled in the art with an enabling description for implementing examples of embodiments described herein as reflected in the claims. It is understood that various changes can be made in the function and arrangement of elements without departing from the spirit and scope as set forth in the appended claims.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent tasked with providing support or information to the user 110 regarding the website or online service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a representative employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
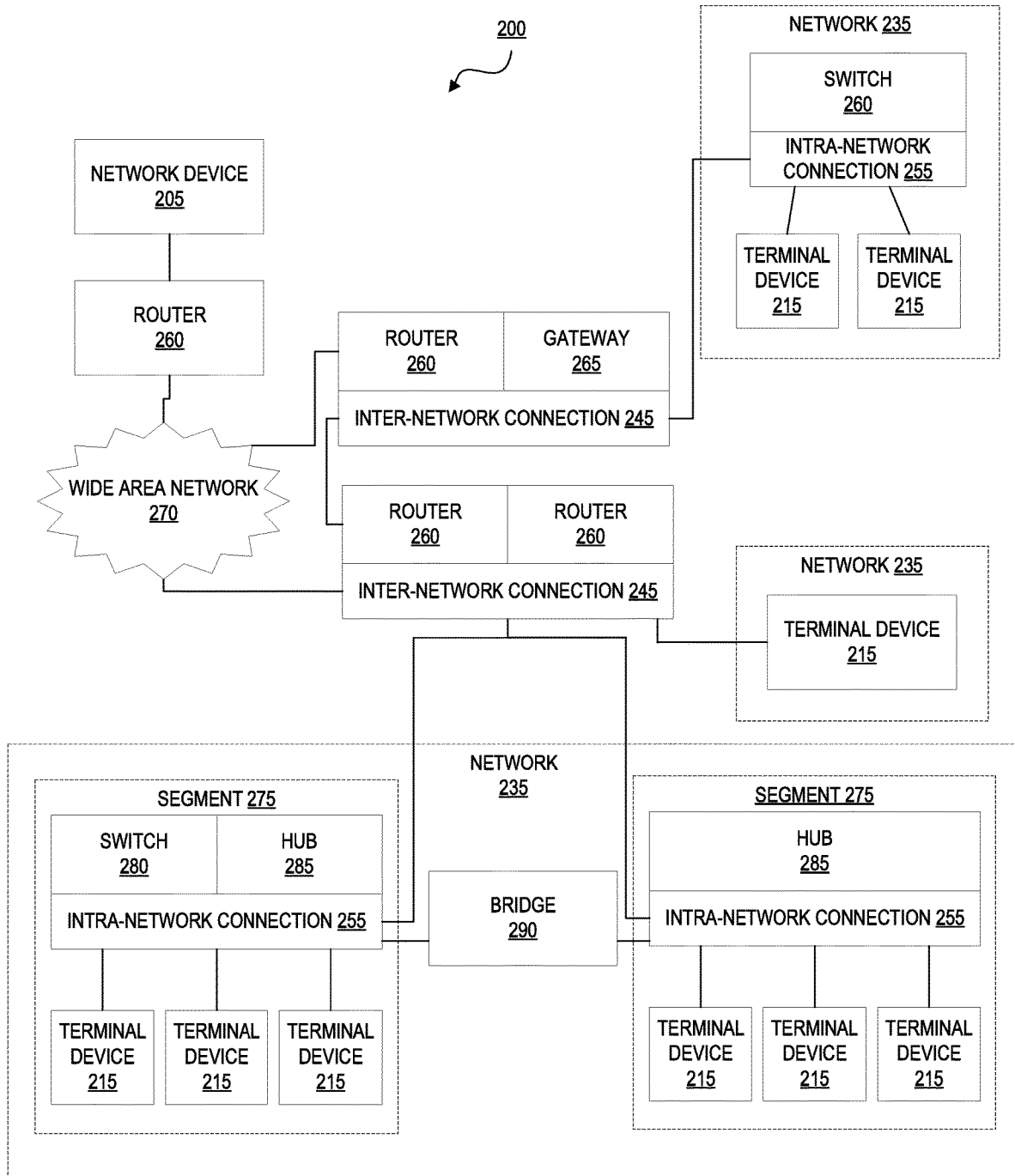
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 245 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication is handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
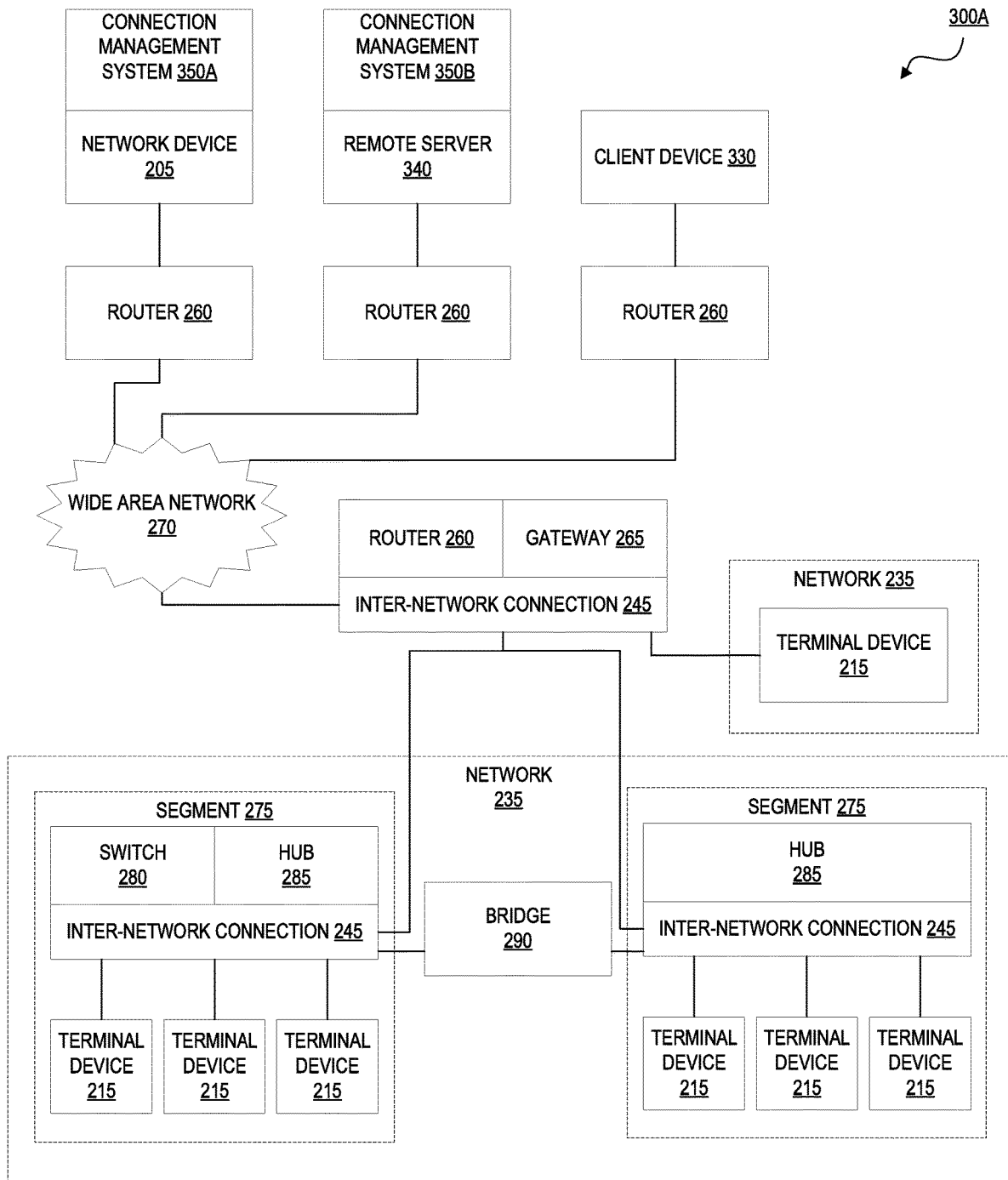
FIGS. 3A-3C show block diagrams of other embodiments of a network interaction system that includes a connection management system.
Figure 3B:
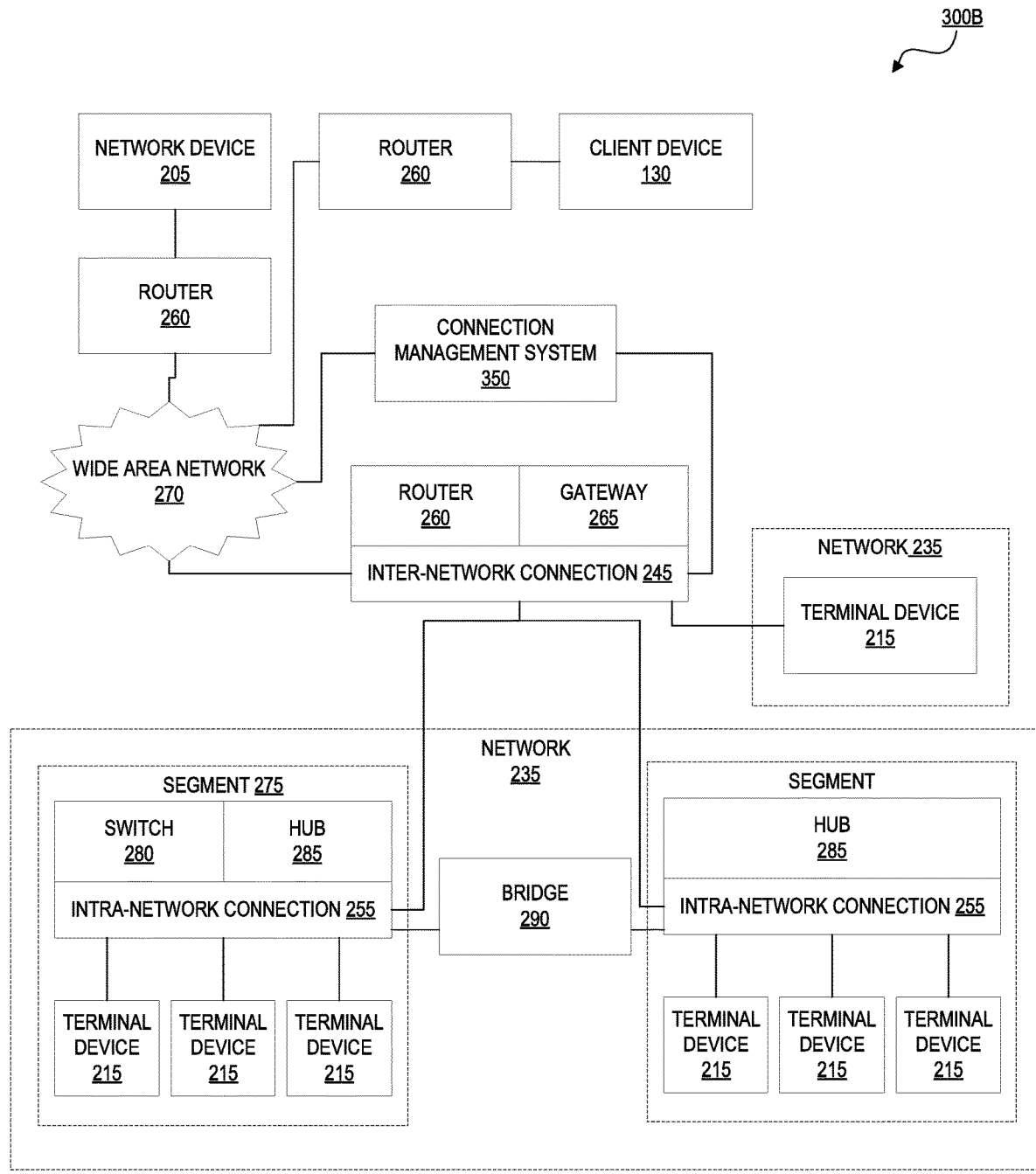
Figure 3C:
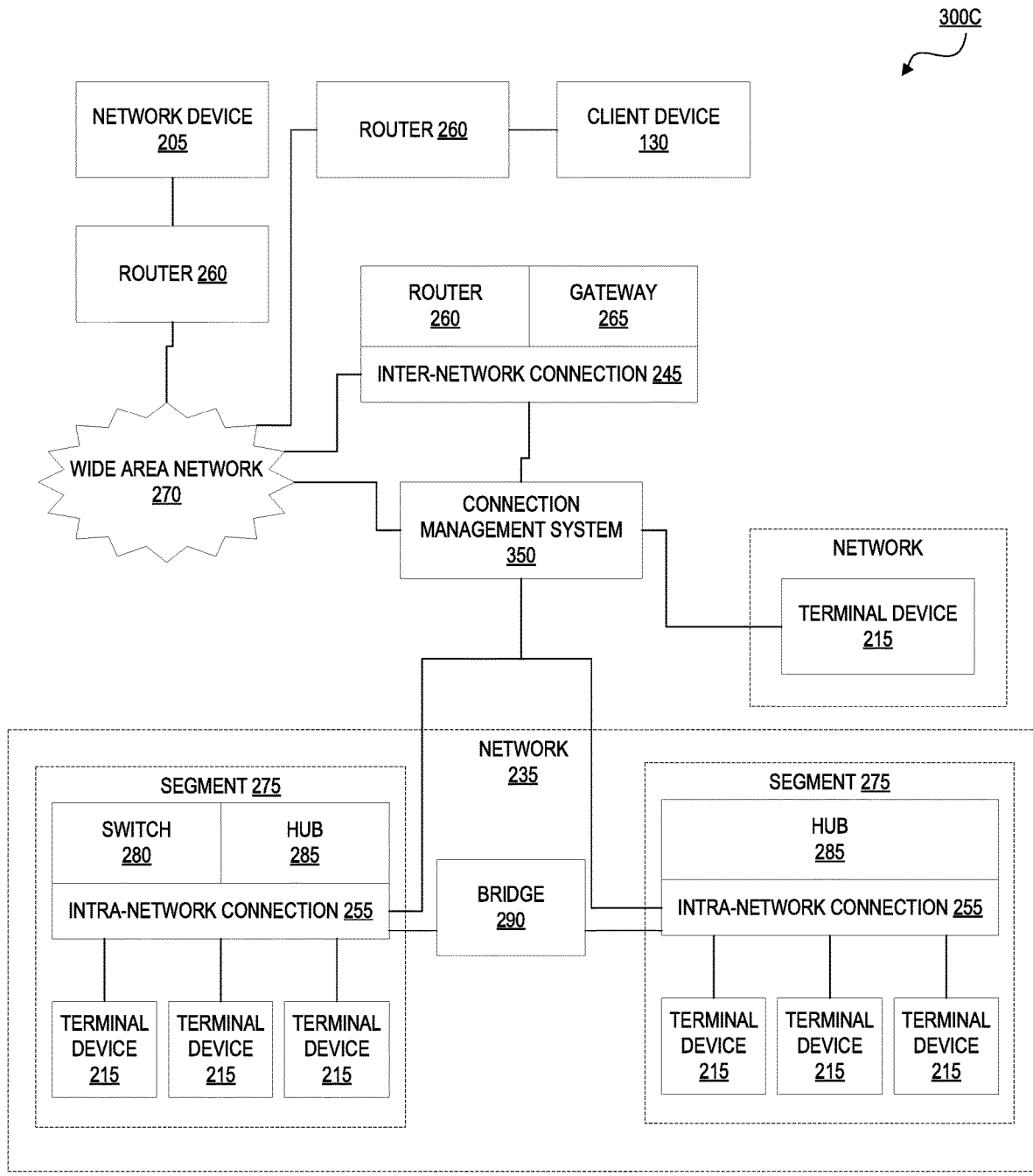

FIGS. 3A-3C show block diagrams of other embodiments of a network interaction system 300A, 300B, and 300C that includes a connection management system. Each of the depicted systems 300A-C show only 2 local-area networks 235 for simplicity, though it can be appreciated that embodiments can be extended to expand the number of local-area networks. Each of systems 300A-C include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350A is associated with network device 205 and connection management system 350B is associated with remote server 340). For example, connection management system 350A and/or connection management system 350B can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 350B executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, connection management system 350B may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
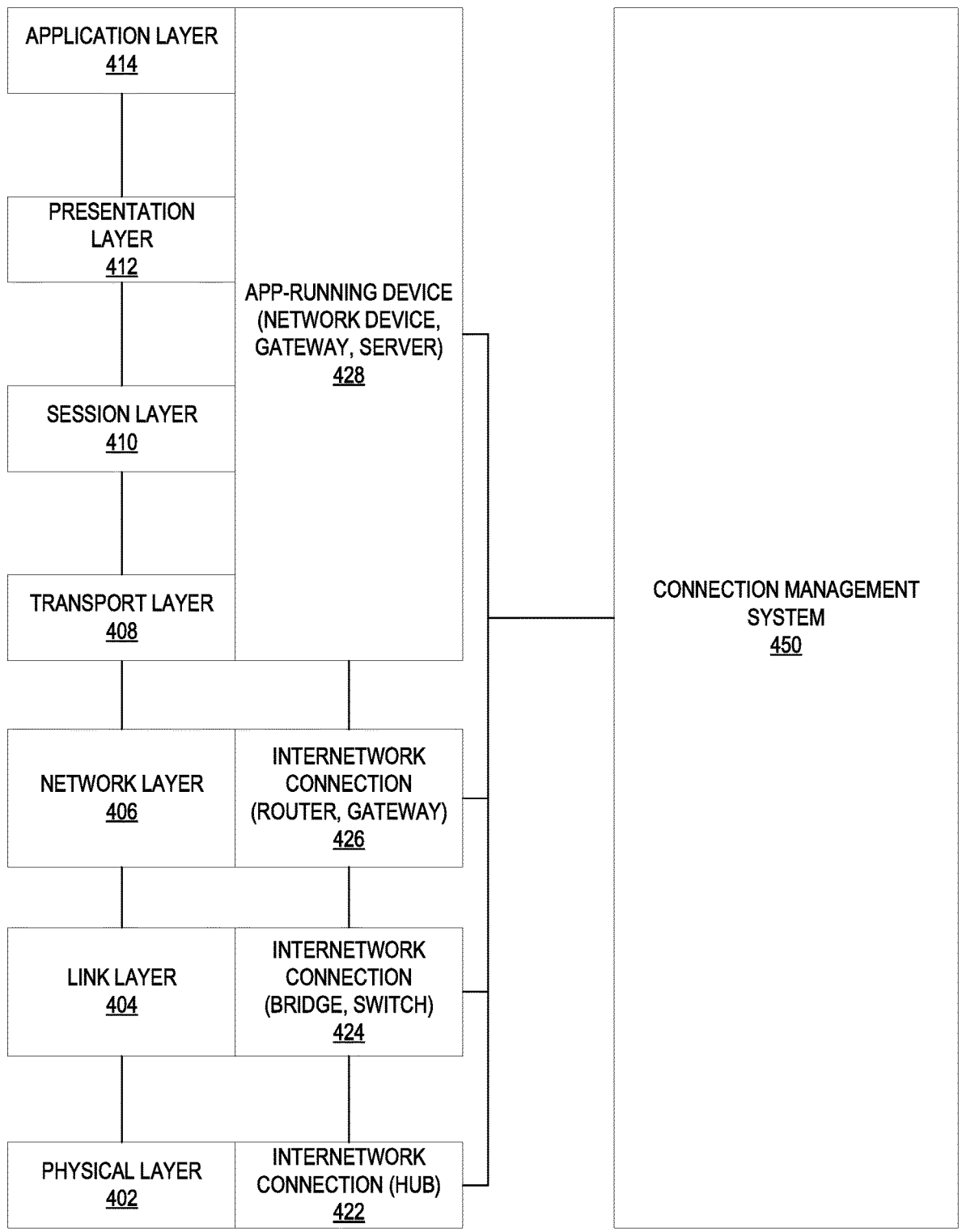
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
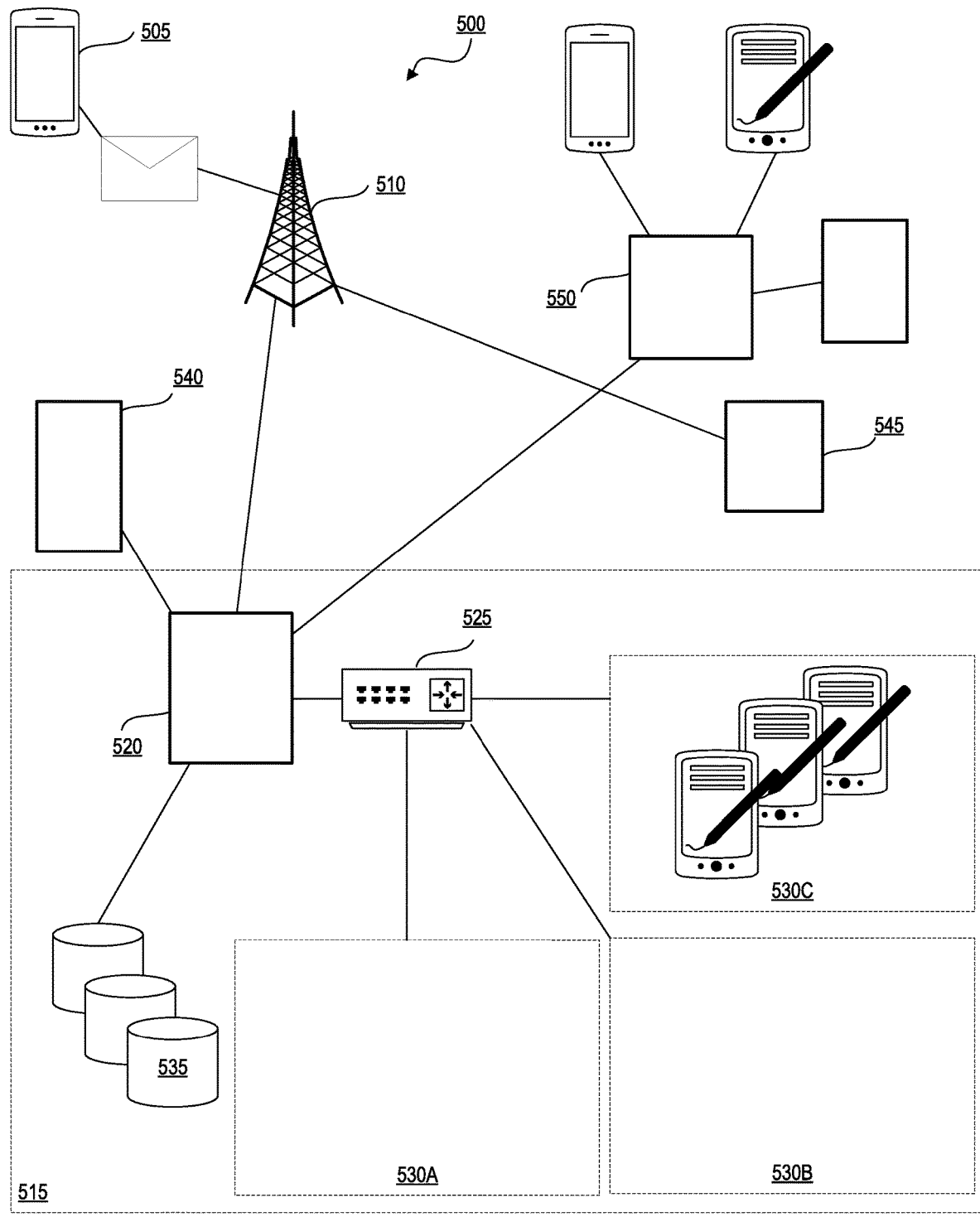
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530A, 530B, and 530C can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity) at one or more data stores 535. Such data may influence communication routing.

Notably, various other devices can further be used to influence communication routing and/or processing. For example, in the depicted instance, connection management system 520 also is connected to a web server 540. Thus, connection management system 520 can retrieve data of interest, such as technical item details, and so on.

Network device 505 may also be connected to a web server (e.g., including a web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) behavior of a given user or class of users.

Figure 6:
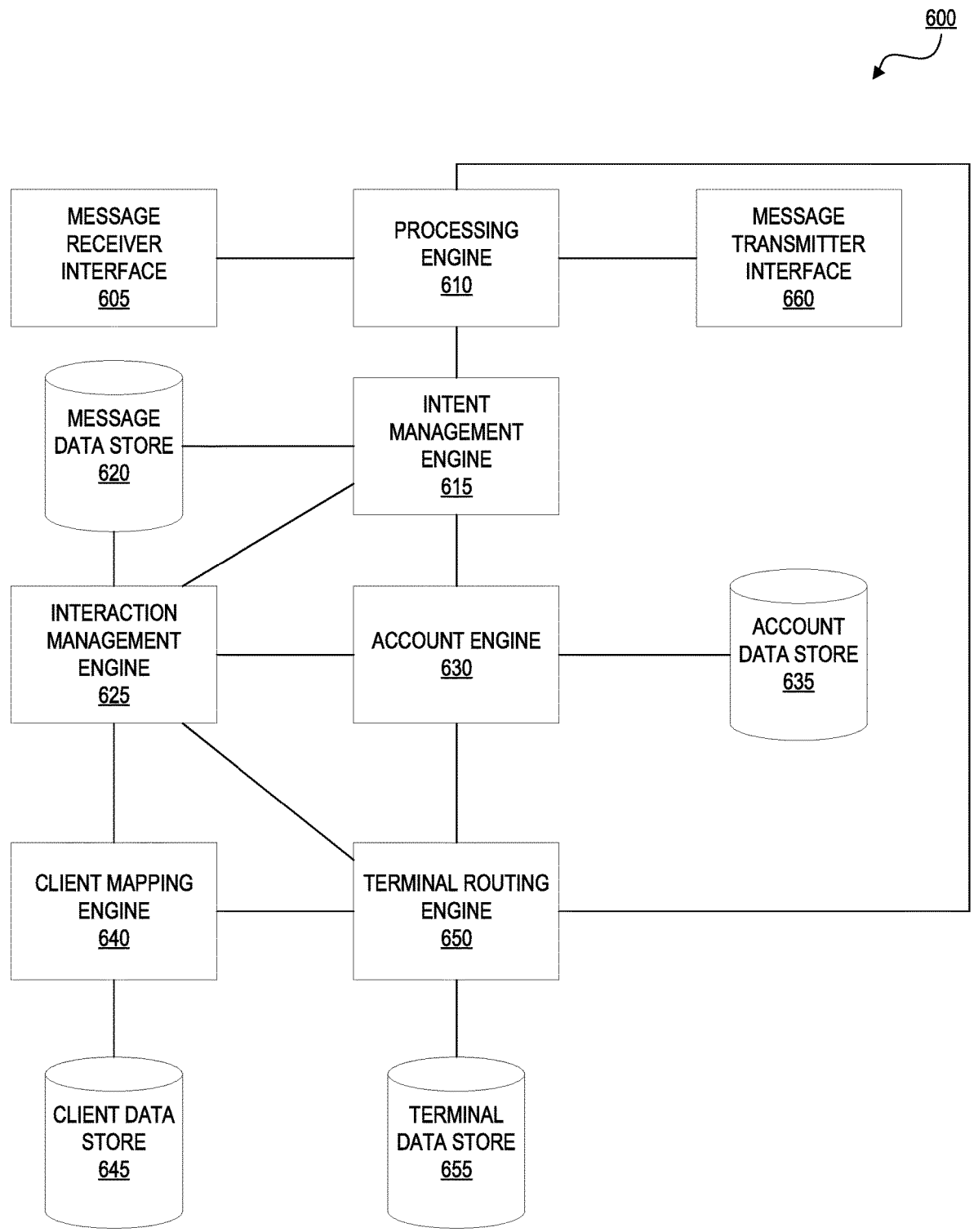
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 625 can (for example) determine whether a terminal device is to respond to a communication via (for example) SMS message, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. The structured facilitation can persist even across message series. In some instances, a representation of a continuous channel (e.g., identifying an agent) can be included in a presentation to be presented on a user's device. In this manner, a user can understand that communications are to be consistently routed so as to promote efficiency.

In one instance, a parameter can be generated using one or more factors and a rule (e.g., that includes a weight for each of the one or more factors) to determine a connection parameter corresponding to a given network (e.g. user) device and terminal (e.g. business client) device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner. In some examples the parameters correlate with a likelihood that a connection will be made between a user device and a client device. In some examples, the parameters do not correlated with a likelihood that a connection will be made, but can correlate with an expected satisfaction score following a interaction.

Different factors may be considered for predicting and facilitating interactions depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated by interaction management engine 625 for potential communication routing of a user to one of the three terminal devices. A parameter may be generated for each terminal that relates to a match between an agent (e.g. as associated with a particular terminal) for the particular communication. Each of the first two terminal devices (e.g. or an agent associated with the terminal) may have previously communicated with a network device having transmitted the communication. An input from the user device (e.g. or any network device associated with a user account) may have indicated positive feedback associated with an interaction with the communication(s) with the first device. Thus, a past-interaction sub-parameter (e.g., as calculated according to a rule) for the first, second and third devices may be 10, 5, and 0, respectively. These sub-parameters can be used with other sub-parameters to determine an overall parameter or to otherwise select a particular terminal for a connection. In some examples, negative feedback inputs may result in negative sub-parameters. In some examples, a system may determine that only the third terminal device is available (e.g. as the other terminals are offline or busy). In some examples, an interaction management engine 625 or other elements of a communication server may predict that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (e.g. an agent associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on. The above is a simplified example of using sub-parameters to determine a single parameter that is further used by a communication server to route connections from a user device to a terminal device (e.g. associated with an agent). In other examples, complex weighting factors, thresholds, and other criteria can be used. In some examples, only values within a threshold range are used. For example, an availability value indicating a wait of 15 minutes can be a threshold limit. Below 15 minutes, a sub-parameters can be used and weighted with other sub-parameters to determine an overall parameter. Above 15 minutes, the terminal device can be excluded from consideration, as the wait is considered unacceptable. In other examples, a cutoff threshold is not used, but the weighting factor can vary nonlinearly. For example, rather than a 15 minute cutoff, sub-parameters below 15 minutes can vary linearly, but above 15 minutes, the sub-parameter value can increase exponentially, or by a linear factor which greatly reduces the chance that a terminal device will be selected by a routing engine (e.g. interaction management engine 625).

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 630 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Figure 7:
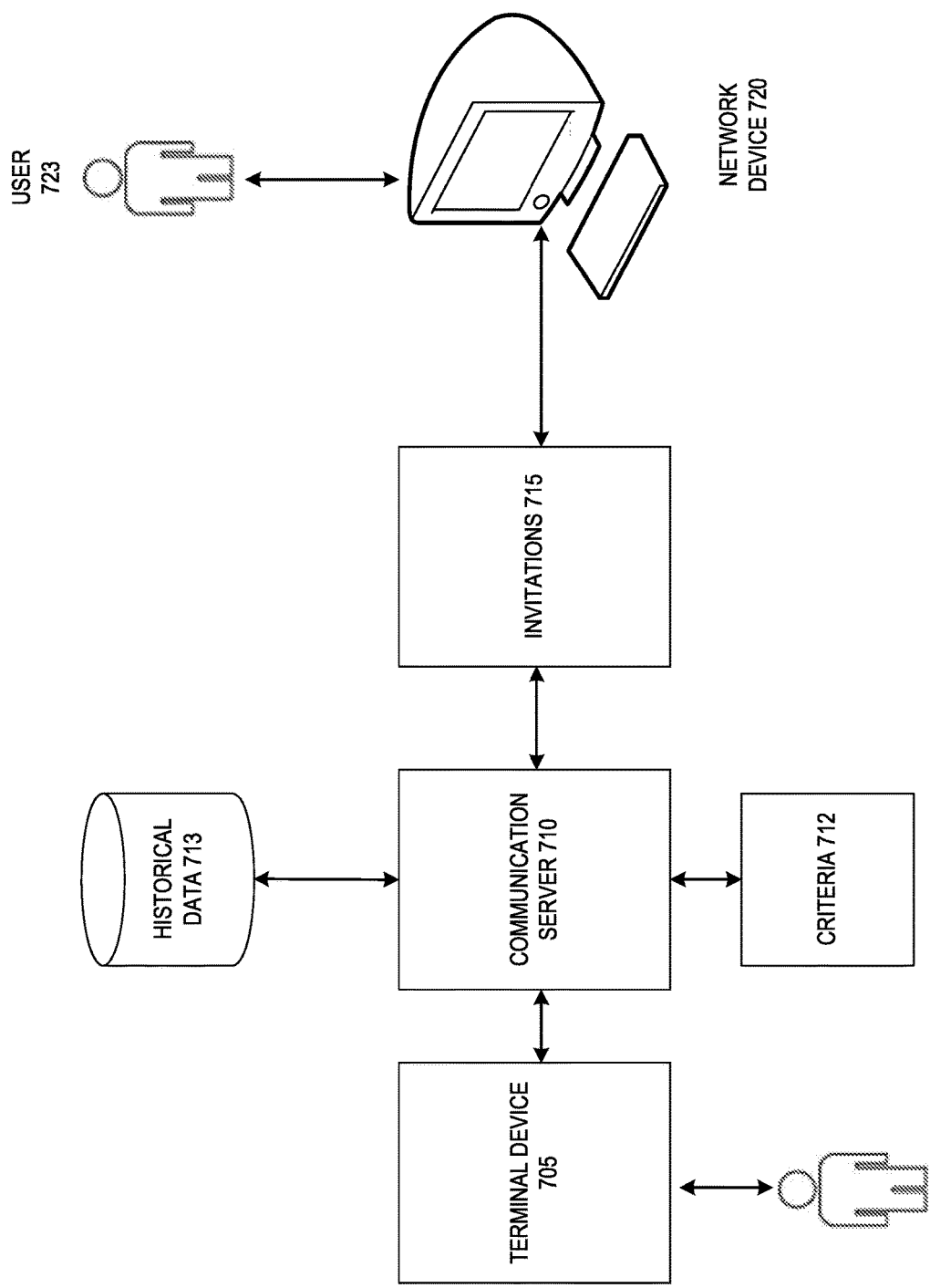
FIG. 7 shows a block diagram of a system for managing interaction invitations according to some embodiments.

FIG. 7 shows a block diagram of a system for managing interaction invitations according to some embodiments. As shown in FIG. 7, a user 723 may operate a device 720 (e.g. a user device or a network device). As described herein, device 720 may be any device having communication capabilities, such as a mobile device, a telephone device, a computing device, a tablet device, and/or the like. Although shown and described as a single user 723 operating a single network device 720, it is contemplated that multiple users may operate multiple devices, and these devices can be associated or otherwise linked by account details to allow user 723 to be contacted via different devices and different communication mechanisms (e.g. text, voice, email, etc.)

The network device 720 may be in communication with a communication server 710, which may communicatively and selectively couple the network device 720 to a terminal device 705. The components may communicate over any suitable network, and can include an open network, such as the Internet, personal area network, local area network (LAN), campus area network (CAN), metropolitan area network (MAN), wide area network (WAN), wireless local area network (WLAN), a private network, such as an intranet, extranet, or other backbone.

The terminal device 705 may be operated by an agent 703. The agent 703 may be a representative of a client and may offer assistance to one or more users 723 for a variety of topics and intents, as described herein. Although shown and described as a single agent 703 operating a single terminal device 705, it is contemplated that multiple agents may operate multiple terminal devices and be in communication with communication server 710, as described herein. Terminal device 705 can be any portable (e.g., mobile phone, tablet, laptop) or non-portable device (e.g., electronic kiosk, desktop computer, etc.). In some instances, the agent 703 can access a website using a browser that is running on terminal device 705. For example, the website can include a console or platform that is running on the browser of terminal device 705. The agent 703 can be logged into the platform using the browser. One or more login credentials (e.g., username, password, and the like) can be used to authenticate the agent 703's identity before allowing the agent 703 to gain access to the console or web applications included in the console. Examples of a console can include a platform that includes one or more APIs (application programming interfaces), a dashboard including one or more functions, a web-hosted application running on a web browser (without the need for downloading plug-ins) that is capable of establishing or joining a communication session, and other suitable interfaces. Further, the console can include one or more web applications or functions that can be executed. The web applications or functions can be executed at the browser, at communication server 710, a local server, a remote server, or other suitable computing device. For example, the web applications, native applications, or functions can enable an agent 703 to communicate with a user 723.

The communication server 710 may be configured to determine the availability of one or more agents 703 to communicate with a user 723. The communication server 710 may determine the availability of the one or more agents 703 by one or more of a variety of methods. For example, the communication server 710 may determine whether or not an associated terminal device 705 is idle by sending a ping or a status request to the terminal device 705. If terminal device 705 is not idle, the communication server 710 may ping the terminal device 705 to determine the capacity of the agent 703, i.e., how many users 723 the agent 703 is already communicating with respect to a maximum or threshold capacity of users 723 for that agent 703. In another example, the agent 703 may proactively set a status on the terminal device 705 that is communicated to the communication server 710. In still another example, the communication server 710 may itself track a number of network devices 720 routed to the terminal device 705, as well as the status of those communications (e.g., completed, resolved, in progress, etc.). The communication server 710 may then infer the status of the terminal device 705 with respect to availability and capacity.

The communication server 710 may further determine an identity of the network device 720 and/or the user 723. The identity of the network device 720 may be determined, for example, by retrieving identifying data associated with the network device 720. Identifying data may include an IP address, a MAC address, a location, a website accessed or requested, data accessed or requested, purchases made on the network device 720, and/or the like. Alternatively or additionally, the communication server 710 may determine an identity of the user 723. The identity of the user 723 may be determined, for example, by retrieving personal identifying information associated with the user 723. Personal identifying information may include a name, an address, a credit card number, a token, purchase history, browsing history, and/or the like. These identities may be stored by the communication server 710 as criteria 712.

In practice, the communication server 710 may be contacted by a network device 720 for any of a variety of purposes. For example, user 723 may use the network device 720 to load a webpage for purchasing a grill. The communication server 710 may determine identifying data associated with the network device 720 and/or personal identifying information with the user 723, i.e., criteria 712. The communication server 710 may further determine criteria 712 associated with the interaction between the network device 720 and the accessed resource (e.g., a webpage). For example, the communication server 710 may determine how long the network device 720 has been on the webpage, how many times the network device 720 has accessed the webpage, other webpages accessed on the network device 720 (e.g., a "help" or "contact us" page), and/or the like. This information may be stored as criteria 712.

The communication server 710 may determine availability of agents 703 via terminal devices 705. The communication server 710 may compare the criteria 712 to historical data 713 stored in a database. The historical data 713 may include previous interactions with previous users 723, as well as the results of those interactions. For example, the historical data 713 may include statistical data indicating whether or not previous users purchased a grill from the webpage when they were offered to chat with an agent 703 while on the webpage. In that example, the criteria 712 may be users visiting webpages with grills. In other examples, criteria 712 may include demographic information, individual historical information, and/or the like. This data may be collected and analyzed using artificial intelligence and/or machine learning techniques.

If statistical data associated with the historical data 713 indicates a higher probability of a given outcome (e.g., a purchase, a request for more information, a resolution of an issue, etc.) based on the criteria 712, an interaction invitation 715 may be extended to network device 720. The interaction invitation 715 may be in any suitable format. For example, the interaction invitation 715 may be in the form of a pop-up box on a webpage or a redirection to a new webpage. The interaction invitation 715 may allow the user 723 to interact with the agent 703 by any suitable method, such as by chat or by phone. After the network device 720 completes its interaction with the terminal device 705, the communication server 710 may determine the outcome of the interaction and store that information in historical data 713 to determine how and when to extend interaction invitations 715 to future users 723 having similar criteria 712.

Figure 8:
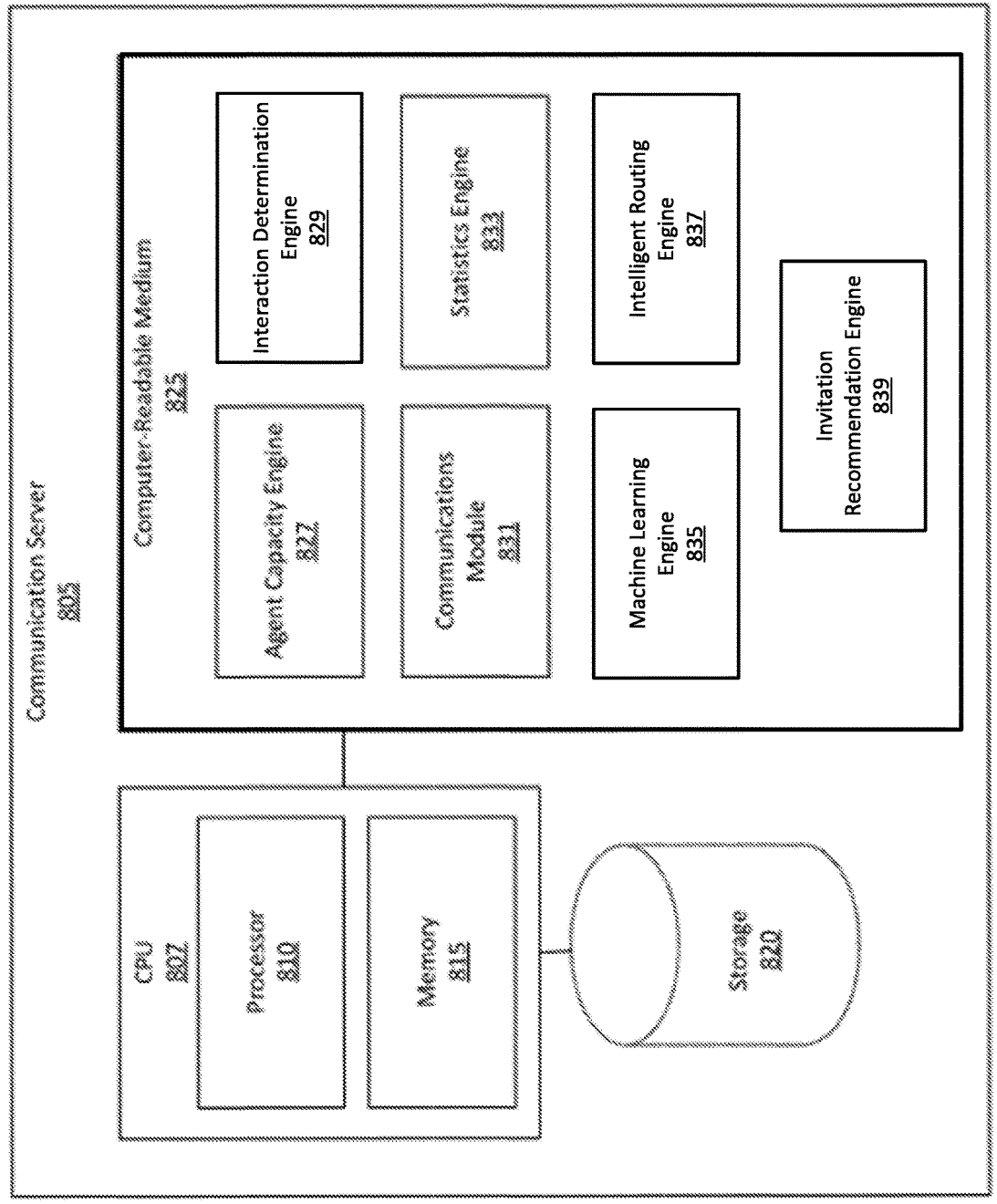
FIG. 8 shows a block diagram of a communication server according to some embodiments.

FIG. 8 shows a block diagram of a communication server 805 according to some embodiments. The communication server 805 may illustrate the internal components of the communication server 710 of FIG. 7. The communication server 805 may include a central processing unit (CPU) 807, including a processor 810 and memory 815. The communication server 805 may further include storage 820. In some embodiments, storage 820 may include historical data 713 and criteria 712. However, in some embodiments, one or both of these components may be stored externally to the communication server 805.

The CPU 807 may be operatively coupled to a computer-readable medium 825 including a plurality of modules: an agent capacity engine 827, an interaction determination engine 829, a communications module 831, a statistics engine 833, and a machine learning engine 835. The agent capacity engine 827 may be configured to, in conjunction with the processor 810, determine capacities associated with a plurality of terminal devices. The terminal devices may be operated by agents, as described herein. The capacities associated with the plurality of terminal devices may be used by the interaction determination engine 829 to determine a number of available interactions. For example, if a single agent is capable of communicating with ten users at a time, and the agent is already communicating with five users, there may be five available interactions.

The communication module 831 may be configured to, in conjunction with the processor 810, transmit the available interaction invitations. The communication module 831 may further be configured to, in conjunction with the processor 810, receive acceptance data. The acceptance data may correspond to one or more acceptances of the available interaction invitations by one or more network devices. The network devices may be operated by a user, as described further herein. The one or more network devices may be associated with criteria. The criteria may include identifying data, data regarding the user, data regarding the interaction, and the like.

The statistics engine 833 may be configured to, in conjunction with the processor 810, use the acceptance data to determine statistical data. The statistical data may be associated with a likelihood that additional network devices associated with the criteria will accept an interaction invitation. For example, if five interaction invitations are extended, and only one is accepted, data regarding the accepted invitation may be collected (e.g., criteria) and analyzed to determine the features of that interaction that may result in acceptance of the interaction invitation.

The machine learning engine 835 may be configured to, in conjunction with the processor 810, determine one or more additional network devices by using the statistical data and selecting the network devices using the criteria. For example, the machine learning engine 835 may determine which criteria was associated with the acceptances and apply those criteria to other network devices to determine which are most likely to accept interaction invitations. The machine learning engine 835 may further be configured to, in conjunction with the processor 810, update the number of available interaction invitations available for transmission to the one or more additional network devices. The number of available interaction invitations may be determined according to the acceptance data. For example, if one interaction invitation was accepted, there may be four remaining interaction invitations available. Additional details related to an example machine learning engine are described below with respect to FIG. 9.

In some examples, intelligent routing engine 837 is configurable to route invitations to communicate with agents to the appropriate destination (e.g., to a terminal device or a client device). Intelligent routing engine 837 include code that causes one or more machine-learning techniques or artificial intelligence techniques to intelligently route messages. In some implementations, intelligent routing engine 837 can execute one or more machine-learning techniques to train a model that predicts a destination associated with an invitation to communicate with a terminal or client device. In some examples, a machine learning model is implemented using code within intelligent routing engine 837. In other examples, intelligent routing engine works to provide data to a model implemented in machine learning engine 885. In some examples, more than one machine learning model can be used, and the outputs can be joined or interpreted in various ways by intelligent routing engine 837 to select connections between users and agents via their associated devices (e.g. user network devices and agent terminal or client devices).

In some examples, invitation recommendation engine 839 include code, hardware, or firmware for logic that can analyze a database of invitations (e.g. from memory 815 or storage 820) and outcomes. In some examples, invitation recommendation engine 839 can evaluate the invitations stored in storage using one or more machine-learning algorithms or artificial intelligence algorithms. In some examples, invitation recommendation engine 839 uses history data with data from interaction determination engine 829 to determine a number of invitations to send. This can, for example, use analysis from statistics engine 833 and/or information from machine learning engine 835 and agent capacity engine 827 to determine a likely number of acceptances to interaction invitations sent to currently available user devices in a network. The determination can be customized for parameters assigned to the currently available users, such that for a given number of currently available user devices, the number of interaction invitations to send can be different based on the parameters and sub-parameters assigned to the users. In one example, 100 available user devices are identified in a network, and 25 open slots are available to route communications from user devices to agent terminal devices. Invitation recommendation engine 839 can use information from other parts of communication server 805 to determine that if 50 interaction invitations are communicated to a certain subset of the 100 available user devices, acceptable performance and results will be achievable using the 25 open slots. In a different example, or using a different subset of the 100 available user devices, the invitation recommendation engine 839 may determine that only 45 interaction invitations can be sent while maintaining acceptable results (e.g., having an agent immediately available for an interaction, or available within a threshold time after the interaction invitation is sent). In some examples, this can be based on parameters assigned to individual agents and users. In some examples, this can be based on expectations that additional agent capacity will be available by the time certain users respond. For example, some of the difference between the current number of available agent slots (e.g., 25) and a number of invitations to be sent (e.g., 50) can be not only that some of the invitations will not receive a response, but also that some the number of agent slots will increase by the time some of the users respond to the invitations due to the agents resolving existing previous interactions.

The operations of the engines of medium 825 can be period or real-time to initiate connections and interactions between agents and users via their associated devices. Communication server 805 can function, in some examples, as a continuously operating auto-dialer that issues invitations predictively to user devices based on a complex analysis of agent capacity and parameters assigned to user devices identified in a network. As new devices are identified in the network, previous interactions with agents are resolved to free additional agent capacity, and other parameters (e.g., date, time of day, time since last invitation sent to a particular user, etc.) change, the communication server 805 can transmit additional interaction invitations. These updates can be processed in real-time based on the limitations of processor 810 to perform real-time operations to analyze the current data and issue interaction invitations based on the updated information, or can be processed periodically in batches (e.g., once per hour, twice per day, once per week, etc.)

Figure 9:
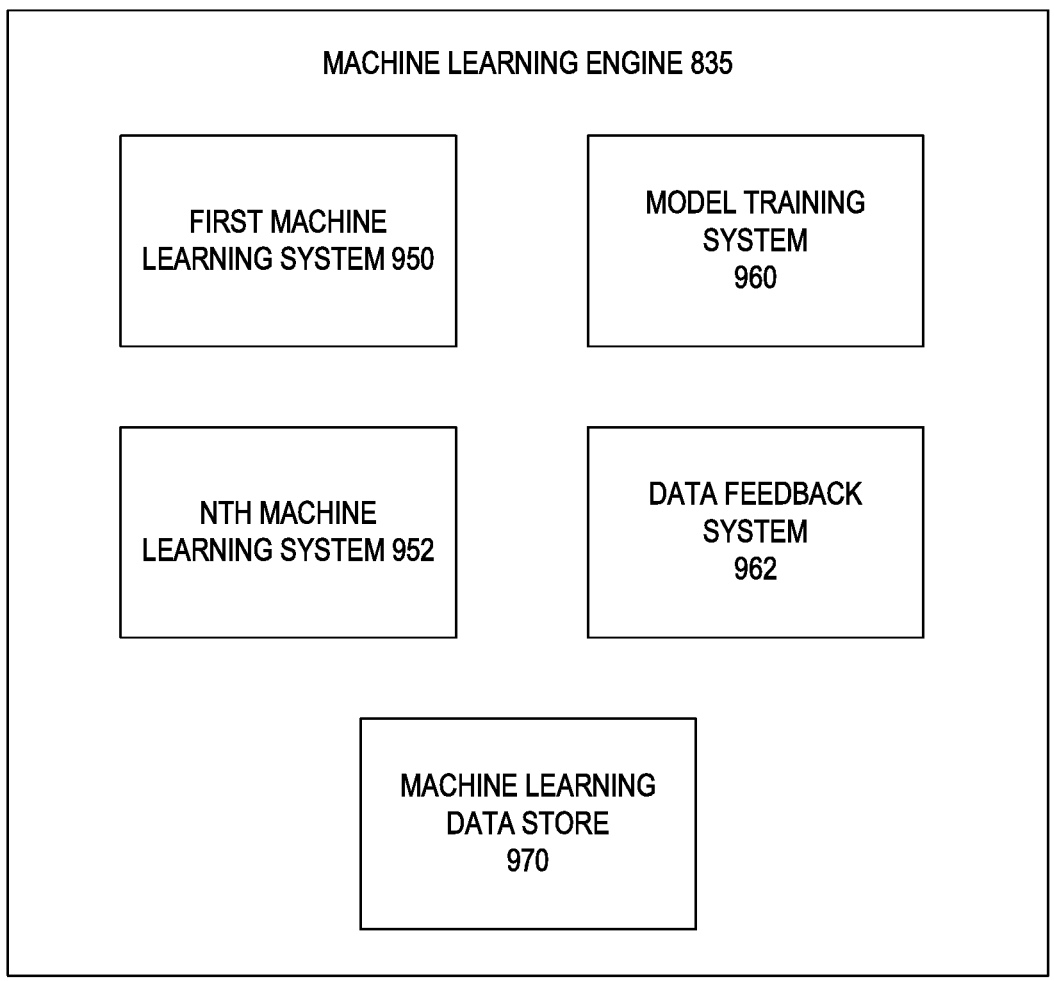
FIG. 9 then shows a block diagram representing an example machine learning engine in accordance with some examples.

FIG. 9 then shows a block diagram representing an example machine learning engine 835 in accordance with some examples. Machine learning engine 835 of FIG. 9 includes multiple machine learning systems to implement different machine learning models, shown as first machine learning system 950 and Nth machine learning system 952. Additionally, machine learning data store 970 is shown, which can provide memory for data used by the machine learning systems. Model training system can be used with any number of machine learning systems and data from machine learning data store 970 to train the different machine learning systems, and data feedback system 962 can manage data updates or results feedback from implementations of the trained machine learning systems to update the data stored in machine learning data store 970 and to provide data for updated training to different models via model training system 960.

In some examples, data feedback system 962 can interact with the systems with machine learning models to use previous data and results of invitations and routing from prior operations to improve selection of future routing and invitations selection. This improvement can be achieved in workload models, probability models for invitation acceptance, user models, agent models, or any other such models generated or updated with any combination of supervised learning with constructed data sets and historical data, unsupervised learning based on expectation or projection models for current routing paths in a system and system use targets. Any such data used to train a model can be used in operations for natural language processing (e.g., natural language understanding, natural language inference, etc.) to generate natural language data or to update machine learning models. Such data can then be used by the client systems or shared with applications running on a network device or on a server to different aspects of managing interaction invitations and the subsequent interactions (e.g., with improved agent and user matching, improved capacity utilization, improved interaction invitations, etc.)

The machine learning systems (e.g. systems 950 and 952) can include different types of machine learning systems, including neural networks, clustering algorithms, and other such machine learning models. The data from machine learning data store 970 can be used by different systems in different ways. The data can be gathered directly from historical interactions in a system 100 with a connection management system 150, but can also include data gathered from other sources, such as from generally available data about users, data derived from analysis of historical data, data received or input from a client, a user, or a third party data provider (e.g., including parameter data that can be both received and calculated). This data can then be used for machine learning and artificial intelligence analysis to manage interaction invitations and interactions between agents and users. For example, in one implementation, a set of goals can be identified. Such goals can include a target set of user feedback scores, a target time-to-first communication, an increased user usage rate, custom targets set by clients for particular types or groupings of interactions, or other such goals. Custom targets can, for example, include one set of targets for one type of interaction (e.g., scheduling a meeting) and a different type of target for a different type of interaction (e.g., resolving a technical support interaction). Such goals can be part of an analysis by a machine learning system when the system is trained and implemented to manage interaction invitations.

In some examples, interaction invitations can be grouped by an expected interaction type, such that interaction invitations of a certain type are processed together using specialized machine learning systems adapted to the type of expected interaction. A system can use data to determine if a prediction is able to be made about certain available users in a network. For example, the available data can predict that 100 users are available, 30 of those users are expected to schedule an appointment, 15 are expected to seek technical support, 10 are expected to want information about a product, and the system is not able to make an acceptable prediction for the remaining set of users. In some examples, one machine learning model is used to analyze data for the 100 users to generate this data, and then different machine learning models are used to process each grouping of users separately. The available parameters for each group can then be used to match agent availability, expected workload associated with an acceptance, an acceptance rate, and any other such data to determine how many interaction invitations to communicate.

In one example, some user devices can be prioritized based on particular information, such as a previous attempt to interact with an agent via the communication system that failed. In such an example, a user device can be identified based on information received as part of a user device initiated request for an interaction when agent capacity was not available to provide an interaction. When the communication system later identifies the same device, data stored at the communication system can verify that the user device has not engaged in an interaction since the previous user device request for an interaction. The user device can then be prioritized for an interaction invitation initiated by the communication system. In other examples, other such information stored in a communication system can be used to set such priorities.

In some examples, one or more combinations of input data selected from a data store can be processed to select options associated with the set of system goals. In one implementation, the combinations of data can be processed using a convolutional neural network trained using history data. Training such a neural network can involve identifying a set of outputs associated with the set of option goals, structuring the network around the historical data associated with the goals to train the neural network, and then implementing the neural network in a communication server 805. When data is received, it can be combined with any additional available information on a user and client and then processed with other data to manage interaction invitations.

In another implementation, other types of classification analysis can be performed on the data available to classify one or more options or sets of options in association with the option goals. This can, for example, be performed with Bayesian classification to identify particular types of data sets (e.g. sets of merchant identifier values, purchase amount values, location values, etc.) that can be grouped based on a history data association with result data that matches option goals. When data for a real-time user presence in a system is received, a classification analysis of the data for the current real-time user interactions can be performed to group the available users as described above, and based on the identified class, a set of options associated with the identified class can be selected and provided to different systems for further analysis and determination associated with interaction invitations.

As described herein, in some examples, an initial analysis can be performed to determine if the currently available agent capacity is sufficient to meet all existing possible demand if all available users accept an interaction invitation. If sufficient agent capacity is available, no further analysis is used. If sufficient agent capacity is not present, additional analysis can be used. In some examples, the level of mismatch between the identified number of available users and the insufficient agent capacity can trigger increasing levels of machine analysis to adequately direct the limited agent resources to the highest priority available users in the network. This can involve different machine learning systems to analyze user data and generate groups of user priority levels. Once the analysis has been performed, and the interaction invitations finalized, then the invitations are initiated by the communication server 805. The communication server 805 can then gather data on the response rate, and can route acceptance responses in accordance with the previous analysis to match agent capacity to interaction acceptance responses. As agent capacity can change in real time, this follow-up by communication server 805 can include further operations to appropriately route an acceptance to an interaction invitation in real-time.

In some such systems, invitation recommendation engine decisions supporting by machine learning systems can be used with options to perform AB testing to update models and test training data used for decision making. For example, different models can be used with different user groups and results can be processed following completion of the interactions to analyze information such as an acceptance rate, an interaction match performance (e.g., associated with whether users accepting an interaction invitation were connected to an agent within a threshold time) or other such post-process performance analysis. The performance between the A and B operations can then be analyzed to select a preferred set of operations (e.g., a preferred machine learning model or training data set), or to select a C group for additional testing. For example, in one implementation, a set of classifications can be identified from history data, but the set of options for a particular classification can have multiple different combinations that achieve different but desired expected results associated with option goals. In such a system, a communication server 805 can select from among the different combinations of options, and identify the particular set of options provided to groups of users and clients that interact using communication server 805. As the different option groups are provided to different users, and subsequent result data is received by the system, this subsequent result data can be used to further refine the options provided to clients for setting goals and routing, as well as for managing invitations, in future operations.

Figure 10:
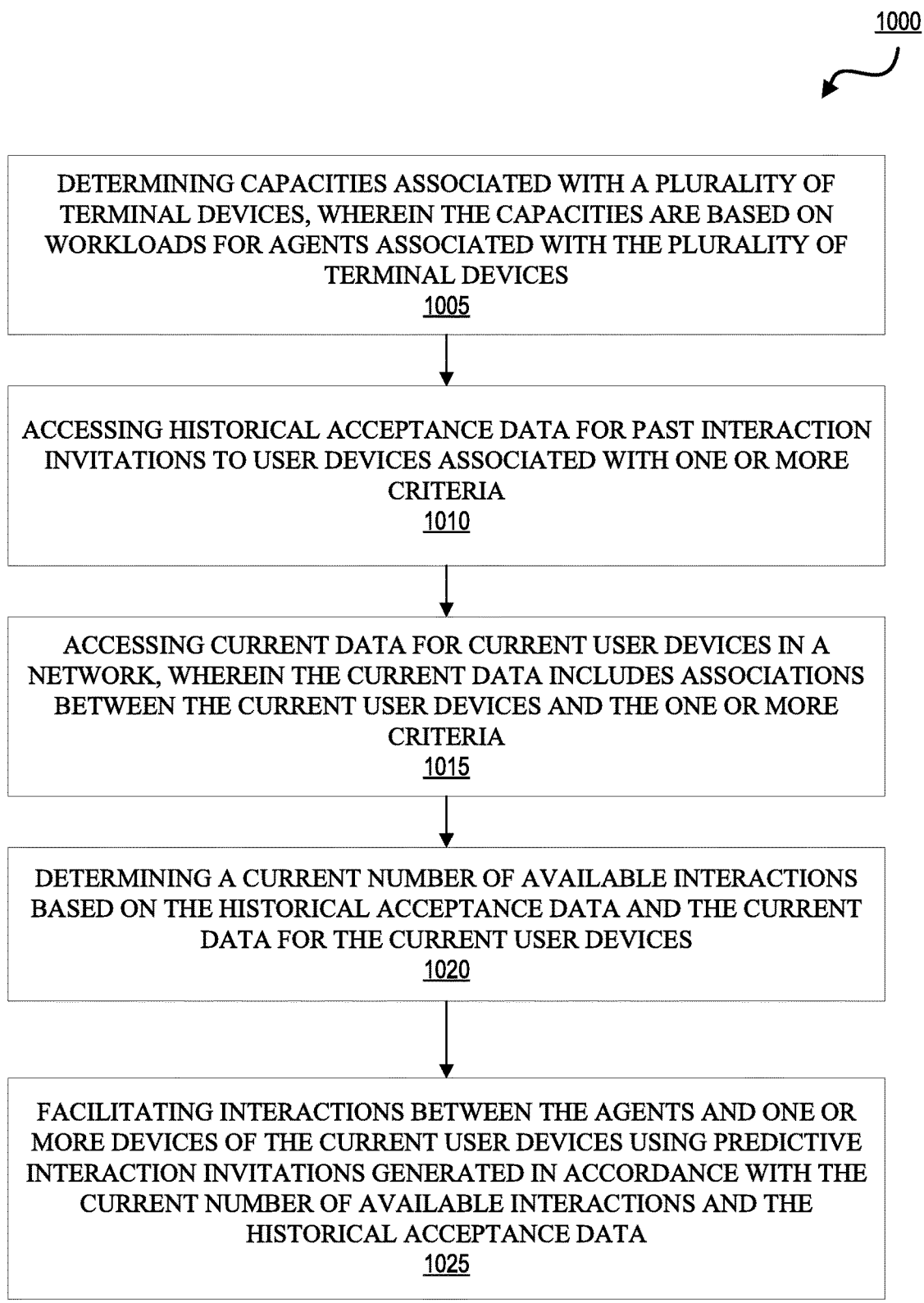
FIG. 10 shows a flowchart of a method for managing interaction invitations according to some embodiments.

FIG. 10 shows an example process for managing interaction invitations according to some embodiments. The method 1000 of FIG. 10 can be performed by a communication server 805 in some examples, or by a combination of devices in a network in other examples. In some examples, processing circuitry of a device such processor 810 of communication server 805 performs the operations for the described blocks of method 1000. In some examples, method 1000 can be implemented as computer readable instructions stored in a memory of a device, such as communication server 805. When the instructions are processed by processing circuitry of the device, such as processor 810, the processor (e.g., and any additional processing circuitry) can cause the device to perform the operations of method 1000.

Method 1000 includes block 1005 including operations to determine capacities associated with a plurality of terminal devices. In some examples, the capacities are based on workloads for agents associated with the plurality of terminal devices. In additional examples, additional capacity criteria can be used, such as an expected completion rate or new capacity availability expected during an acceptance delay time (e.g., a time between transmission of an interaction invitation and an acceptance response), a response time limit for a current configuration (e.g., a time following communication of an interaction invitation after which the invitation will be considered expired and use a new analysis of capacity or agent availability), agent schedule changes within an acceptance delay time, or other such information.

Method 1000 includes block 1010 including operations for accessing historical acceptance data for past interaction invitations to user devices associated with one or more criteria. As described above, this data can be updated periodically or continuously with results of new interaction offer operations, and the access can be structured around updates to the historical data. In addition, other data, including segmenting the historical data around interaction types, user types, customer types, or other such classification types can be used to improve results.

Method 1000 includes block 1015 including operations for accessing current data for current user devices in a network, where the current data includes associations between the current user devices and the one or more criteria. Just as described above, this data can be updated periodically or in real-time, and the access can be configured around the data updates for the current data. In some examples, the access or the entire method 1000 can be triggered by a data update. In some examples, any operations can be scheduled periodically, or can be based on system (e.g., processor) resources needed to perform the operations of method 1000.

Method 1000 includes block 1020 with operations for determining a current number of available interactions based on the historical acceptance data and the current data for the current user devices. This number of available interactions can be based on different combinations of machine learning data or model results, statistical data or modeling, or other such system analysis.

Method 1000 then includes block 1025 with operations for facilitating interactions between the agents and one or more devices of the current user devices using predictive interaction invitations generated in accordance with the current number of available interactions and the historical acceptance data. As described above, this can include transmitting a set of invitations based on a match or mismatch between agent capacity and the current users identified in a system. If the available number of users exceed expected capacity, a greater number of invitations can be sent than the system has capacity to handle, based on machine learning or statistical modeling of an acceptance rate. This can include both a model of the rejections (e.g., negative responses or non-responsive users) as well as modeling the expected delays in response times. This can include some expectations of real-time or immediate responses, as well as staggered responses where there is a significant delay between an invitation being transmitted and the response accepting the invitation being received. The delay can result in changes to the agent capacity between the timing of the invitation and the response, and such impacts can be modeled by a communication server or other devices implementing method 1000.

In some examples, the current data includes real-time data gathered via the network for the current user devices in the network available to receive a targeted interaction invitation. In some examples, determining the current number of available interactions includes automatically providing the capacities for the agents and the current data for the current user devices to a machine learning system trained using the historical acceptance data including the one or more criteria, and automatically receiving a value for the current number of available interactions from the machine learning system. In some such examples, the machine learning system includes a first neural network trained to dynamically determine the value for the current number of available interactions using the historical acceptance data and a second neural network trained to dynamically determine a likelihood of acceptance for each device of the current user devices using the historical acceptance data.

In some examples, facilitating the interactions between the agents and the one or more devices includes dynamically determining that the current number of available interactions is less than a number of the current user devices, automatically analyzing the current user devices to identify a subset of the current user devices matching the current number of available interactions, and automatically communicating a targeted interaction invitation to each current user device of the subset of the current user devices. In some examples, analyzing the current user devices to identify the subset of the current user devices includes analyzing the historical acceptance data for the past interaction invitations and the one or more criteria for the current user devices to prioritize each device of the current user devices based on a likelihood of acceptance of the targeted interaction invitation.

Some examples can further involve automatically receiving interaction data for the interactions between the agents and the one or more devices, generating updated historical acceptance data using the interaction data and the historical acceptance data, automatically accessing updated current data for the current user devices in the network, and dynamically generating an updated current number of available interaction invitations based on the updated historical acceptance data and the updated current data for the current user devices.

Additional examples, can include repeated operations or intervening operations. Additionally, other devices, including terminal devices associated with agents and user network devices associated with users can perform corresponding and supporting operations for each of the operations described herein. Additional such operations in support of the described operations are therefore possible in accordance with the examples described herein.

Figure 11:
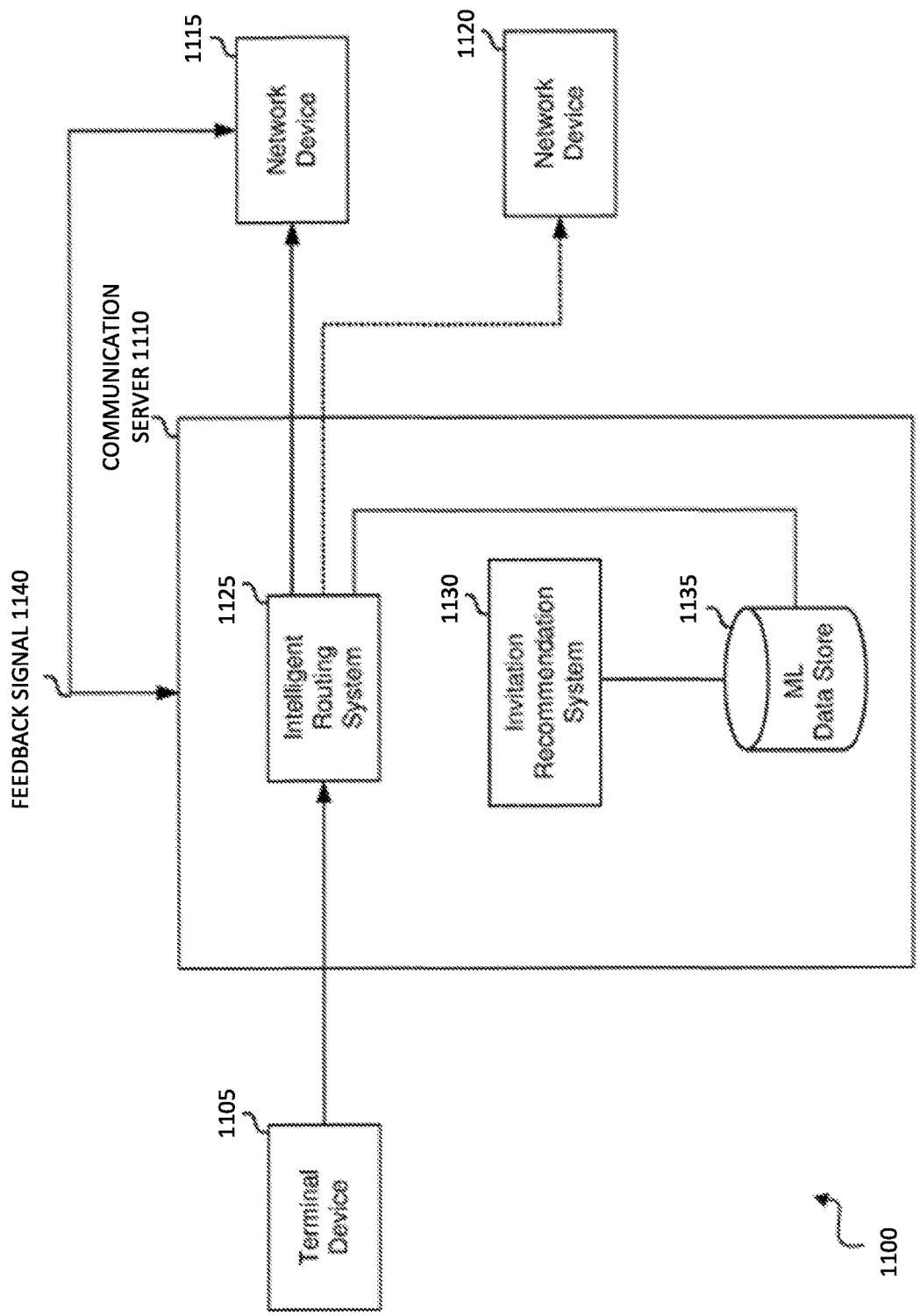
FIG. 11 shows an example process for managing interaction invitations.

FIG. 11 shows a block diagram representing network environment 1100 for enhancing network device selection using machine-learning techniques. Network environment 1100 may include terminal device 1105, communication server 1110, and network devices 1115 and 1120. Communication server 1110 can facilitate the establishment of a communication channel that enables terminal device 1105 and at least one network device 1115 or 1120 to communication.

Communication server 1110 may include intelligent routing system 1125, invitation recommendation system 1130, and machine learning data store 1135. Each of intelligent routing system 1125 and invitation recommendation system 1130 may include one or more computing devices with a processor and a memory that execute instructions to implement certain operations. In some implementations, intelligent routing system 1125 may be a bot configured to intelligently route invitations to communicate with the terminal device 1105 to the appropriate destination. Intelligent routing system 1125 may include one or more processors configured to execute code that causes one or more machine-learning techniques or artificial intelligence techniques to intelligently route messages. In some implementations, intelligent routing system 1125 can execute one or more machine-learning techniques to train a model that predicts a destination associated with an invitation to communicate with the terminal device 1105.

As a non-limiting example, intelligent routing system 1125 may determine capacity of a terminal device 1105 through a communication channel established or facilitated by communication server 1110 (e.g., a native application configured to enable users to communicate with each other across various devices). Intelligent routing system 1125 may evaluate the capacity and availability of the terminal device 1105 according to certain embodiments described above. For example, intelligent routing system 1125 may evaluate the capacity and criteria for transmitting an invitation in conjunction with the invitation recommendation system 1130 using a trained machine-learning model. The outcomes of previously transmitted invitations can be inputted into the machine-learning model to generate a predicted destination (e.g., a particular network device 1115 or 1120). The machine-learning model may be continuously trained based on feedback signal 1140 received from network device 1115 or 1120. If an invitation is accepted by network device 1115, then intelligent routing system 1125 may train the machine-learning model to predict that future invitations including the exact or similar criteria as the accepted invitation are to be sent invitations. However, if intelligent routing system 1125 receives feedback signal 1140 indicating that network device 1115 did not accept the invitation, but rather network device 1120 accepted the invitation, intelligent routing system 1125 can train the machine-learning model that future messages including the exact or similar criteria associated with network device 1120 are to be sent invitations.

Machine learning data store 1135 may store some (e.g., but not necessarily all) or all invitations and outcomes received in the past from one or more network devices. Further, machine learning data store 1135 may also store some or all messages transmitted by terminal devices or bots during previous communication sessions with network devices. Machine learning data store 1135 may also store some or all messages transmitted by network devices to terminal devices during communication sessions. In some implementations, machine learning data store 1135 may be a database of all messages processed (e.g., transmitted by or received at) communication server 1110.

Invitation recommendation system 1130 may analyze the database of invitations and outcomes stored at machine learning data store 1135. In some implementations, invitation recommendation system 1130 may evaluate the invitations stored at machine learning data store 1135 using one or more machine-learning algorithms or artificial intelligence algorithms. For example, invitation recommendation system 1130 may execute one or more clustering algorithms, such as K-means clustering, means-shift clustering, Density-Based Spatial Clustering of Applications with Noise (DBSCAN) clustering, Expectation-Maximization (EM) Clustering using Gaussian Mixture Models (GMM), and other suitable machine-learning algorithms, on the database of invitations and outcomes stored in machine learning data store 1135. In some implementations, a recurrent neural network (RNN) or a convolutional neural network (CNN) may be used to predict outcomes of sent invitations. In some implementations, invitation recommendation system 1130 may use support vector machines (SVM), supervised, semi-supervised, ensemble techniques, or unsupervised machine-learning techniques to evaluate all previous invitations to predict outcomes from network devices when invited to communication sessions.

For example, invitation recommendation system 1130 may evaluate the content of identifying data received from network devices and compare the results of the evaluation to the one or more clusters of previous invitations and outcomes stored in machine learning data store 1135. Once the cluster is identified, invitation recommendation system 1130 can identify the most relevant network devices to receive an invitation based on a confidence threshold. In some embodiments, message recommendation system 1130 may use artificial intelligence and machine learning to evaluate a whether a particular invitation is likely to be accepted. Invitation recommendation system 1130 can access machine learning data store 1135 to identify the cluster of invitations accepted by network devices. Invitation recommendation system 1130 can select one or more network devices based on a confidence threshold. As a non-limiting example, a confidence algorithm can be executed to generate a confidence score. A confidence score may be a percentage value where the lower the percentage, the less likely the invitation is to be accepted, and the higher the percentage, the more likely the invitation is to be accepted. A minimum confidence threshold may be defined as a measure of certainty or trustworthiness associated with each discovered pattern. Further, an example of a confidence algorithm may be the Apriori Algorithm, similarity algorithms indicating similarity between two data sets, and other suitable confidence algorithms.

Figure 12:
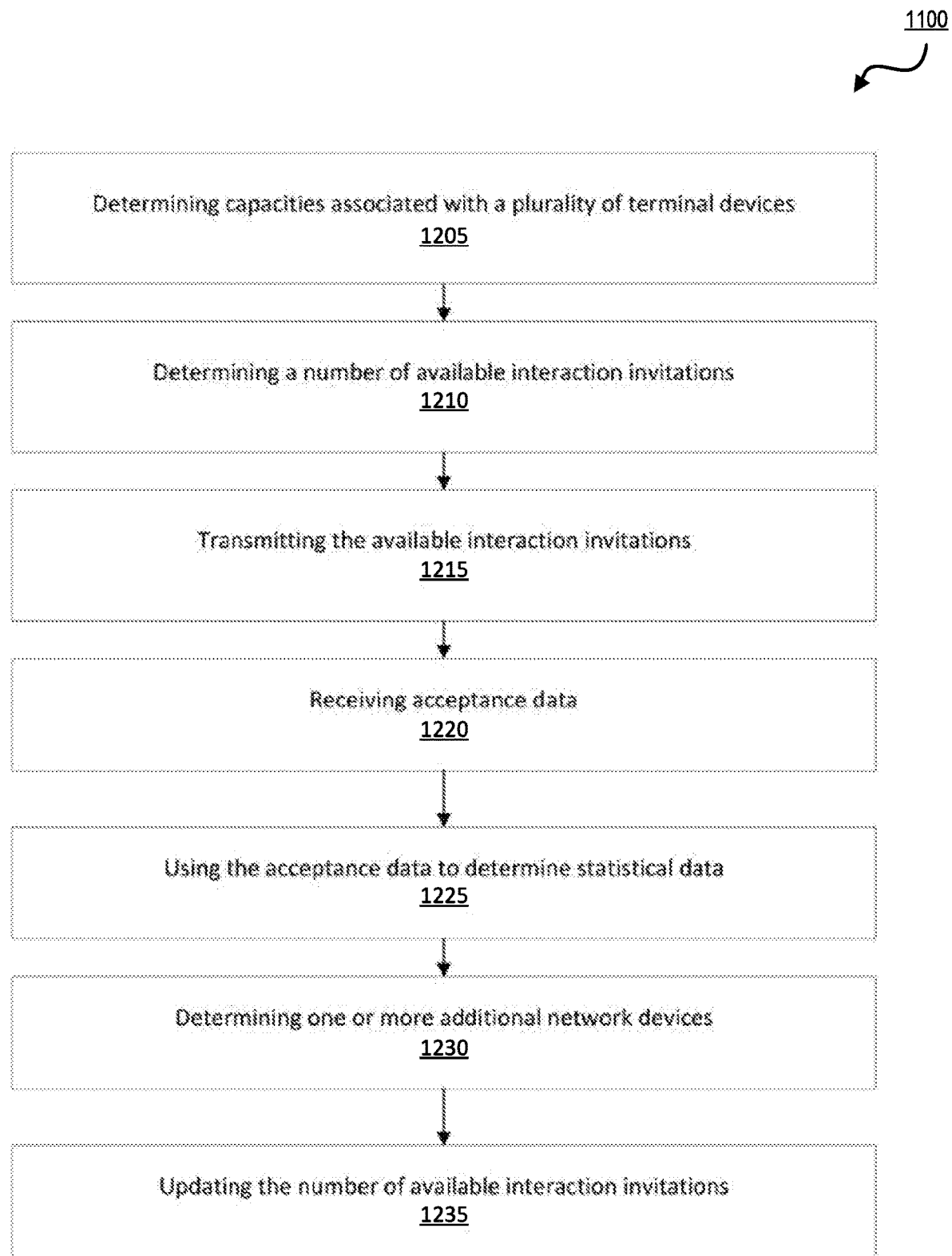
FIG. 12 shows a flowchart of a method for managing interaction invitations according to some embodiments.

FIG. 12 shows an example process for managing interaction invitations according to some embodiments. At step 1205, capacities associated with a plurality of terminal devices may be determined. The capacity of a terminal device may be, for example, the maximum number of network devices with which a particular terminal device may interact at a given time. The capacities of the terminal devices may be determined using any suitable method. For example, it may be assumed that all terminal devices have the same capacity (e.g., ten), unless a particular terminal device indicates otherwise. In some embodiments, terminal devices may have differing capacities based on the strengths and weaknesses of an agent operating a terminal device, based on the experience and knowledge of an agent operating a terminal device, and/or the like. For example, an agent with ten years of experience may have a capacity of ten interactions at a given time, while an agent with one year of experience may have a capacity of two interactions at a given time.

At step 1210, a number of available interaction invitations may be determined. The number of available interaction invitations may be determined using the capacities associated with the plurality of terminal devices. For example, if the capacity of a terminal device is ten network devices, and the terminal device is already interacting with two network devices, the number of available interaction invitations may be eight. The number of available interaction invitations may be determined using any suitable method. For example, the availability and capacities of terminal device may be automatically tracked by a communication server in some embodiments. In some embodiments, the terminal devices may ping a communication server with their availability on a regular, periodic, as needed, or as requested basis.

At step 1215, the available interaction invitations may be transmitted. The available interaction invitations may be transmitted to network devices operated by users in some embodiments. The available interaction invitation may be displayed on a user interface at a network device in any suitable form, such as one or more interactive elements displayed on the network devices. For example, an interaction invitation may be displayed as a pop-up window overlaid on a previously accessed resource, website, webpage, or application. In another example, an interaction invitation may replace the previously accessed resource, website, webpage, or application interface such that the entire screen is occupied by the interaction invitation. In some embodiments, the interaction invitation may be displayed both visually and audibly, or audibly without visual representation.

At step 1220, acceptance data may be received. The acceptance data may correspond to one or more acceptances of the available interaction invitations by one or more network devices. For example, the interaction invitation may state, "Do you wish to speak to an agent?" An acceptance of the interaction invitation may include a user selection on a network device of a positive interactive element, such as a "yes", a check mark, a thumbs up, a green button, and/or the like. The one or more network device may be associated with criteria. The criteria may be any data corresponding to the network device or the user operating the network device, such as identifying data, personal identifying information, contextual information related to the interaction (e.g., length of interaction, browsing history, etc.), and/or the like.

At step 1225, the acceptance data may be used to determine statistical data. The statistical data may be associated with a likelihood that additional network devices associated with the criteria will accept an available interaction invitation. For example, the acceptance data may indicate that network devices associated with users in New York, N.Y. were more likely to accept an interaction invitation than the general population. Thus, additional network devices associated with New York, N.Y. would be considered likely to accept an available interaction invitation, if the opportunity were to be extended to them.

At step 1230, one or more additional network devices may be determined. Determining may include using the statistical data. The one or more network devices may be associated with the criteria. For example, network devices interacting with a communication server may be monitored to determine whether their interactions originate from New York, N.Y. Those network devices may be selected.

At step 1235, the number of available interaction invitations available for transmission to the one or more additional network devices may be updated. The number of available interaction invitations may be updated according to the acceptance data. For example, if there were 200 available interaction invitations and 12 of them were accepted, the number of available interaction invitations may be decreased to 190. Thus, 190 available interaction invitations may be available to the one or more additional network devices. In some embodiments, the updated available interaction invitations may be extended to the one or more additional network devices. The outcomes of those interaction invitations (e.g., accepted, issue resolved, purchase made, etc.) may be tracked and fed into a machine learning algorithm to draw inferences and construct models of criteria for network devices most likely to accept interaction invitations and/or most likely to take positive actions after an interaction invitation is accepted, such as resolution of an issue, completing a purchase, requesting more information, and/or the like.

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Figure 13:
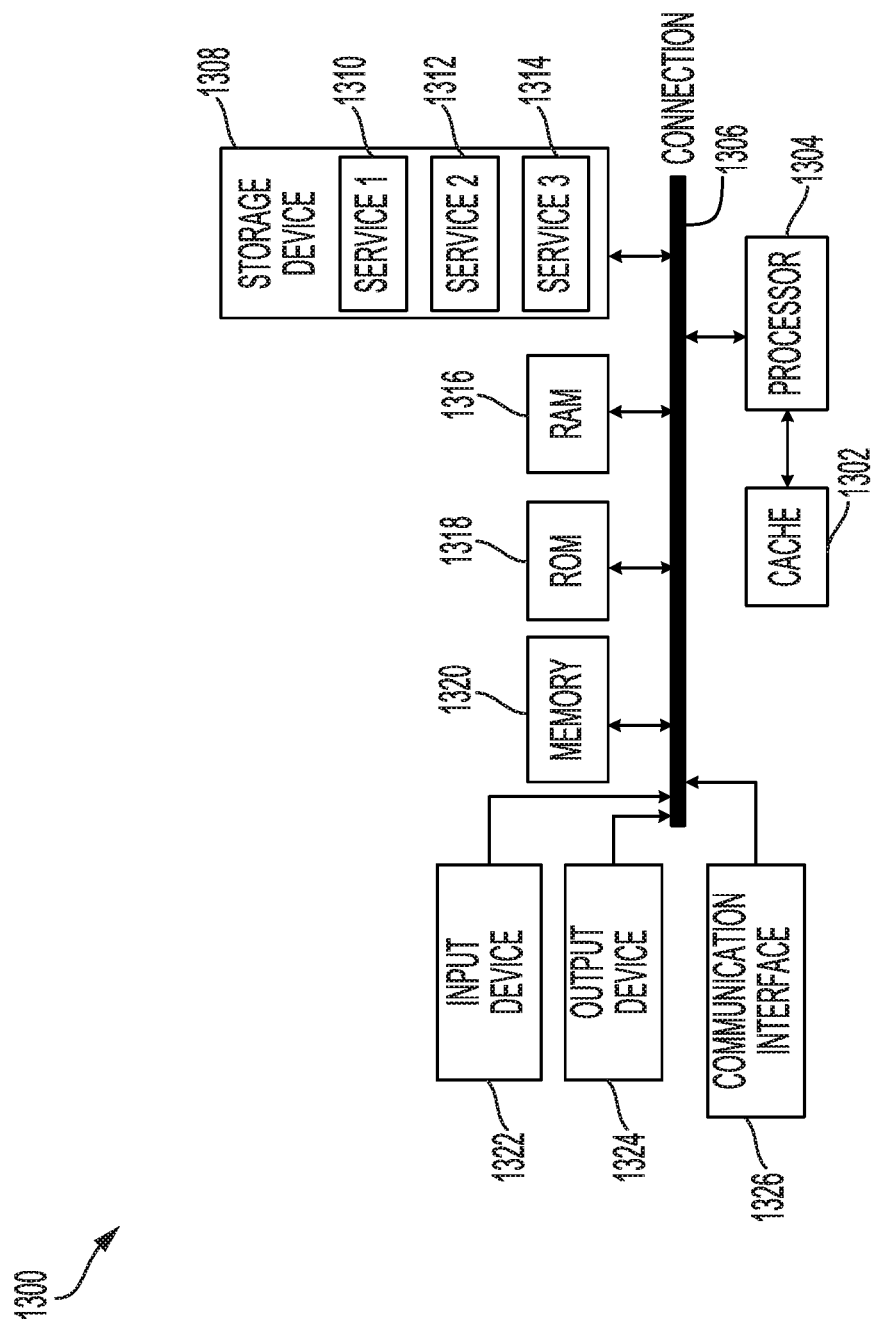
FIG. 13 shows an example computing device that can be used to implement various components of systems in accordance with examples described herein.

FIG. 13 shows an example computing device that can be used to implement various components of systems in accordance with examples described herein. This can include any terminal device, user device, network device, client device, communication device, server, or other device described herein used for management of interaction invitations. FIG. 13 illustrates a computing system architecture 1300 including various components in electrical communication with each other using a connection 1306, such as a bus, in accordance with some implementations. Example system architecture 1300 includes a processing unit (CPU or processor) 1304 and a system connection 1306 that couples various system components including the system memory 1320, such as ROM 1318 and RAM 1316, to the processor 1304. The system architecture 1300 can include a cache 1302 of high-speed memory connected directly with, in close proximity to, or integrated as part of the processor 1304. The system architecture 1300 can copy data from the memory 1320 and/or the storage device 1308 to the cache 1302 for quick access by the processor 1304. In this way, the cache can provide a performance boost that avoids processor 1304 delays while waiting for data. These and other modules can control or be configured to control the processor 1304 to perform various actions.

Other system memory 1320 may be available for use as well. The memory 1320 can include multiple different types of memory with different performance characteristics. The processor 1304 can include any general purpose processor and a hardware or software service, such as service 1 1310, service 2 1312, and service 3 1314 stored in storage device 1308, configured to control the processor 1304 as well as a special-purpose processor where software instructions are incorporated into the actual processor design. The processor 1304 may be a completely self-contained computing system, containing multiple cores or processors, a bus, memory controller, cache, etc. A multi-core processor may be symmetric or asymmetric.

To enable user interaction with the computing system architecture 1300, an input device 1322 can represent any number of input mechanisms, such as a microphone for speech, a touch-sensitive screen for gesture or graphical input, keyboard, mouse, motion input, speech and so forth. An output device 1324 can also be one or more of a number of output mechanisms known to those of skill in the art. In some instances, multimodal systems can enable a user to provide multiple types of input to communicate with the computing system architecture 1300. The communications interface 1326 can generally govern and manage the user input and system output. There is no restriction on operating on any particular hardware arrangement and therefore the basic features here may easily be substituted for improved hardware or firmware arrangements as they are developed.

Storage device 1308 is a non-volatile memory and can be a hard disk or other types of computer readable media which can store data that are accessible by a computer, such as magnetic cassettes, flash memory cards, solid state memory devices, digital versatile disks, cartridges, RAMs 1316, ROM 1318, and hybrids thereof.

The storage device 1308 can include services 1310, 1312, 1314 for controlling the processor 1304. Other hardware or software modules are contemplated. The storage device 1308 can be connected to the system connection 1306. In one aspect, a hardware module that performs a particular function can include the software component stored in a computer-readable medium in connection with the necessary hardware components, such as the processor 1304, connection 1306, output device 1324, and so forth, to carry out the function.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method comprising:
    determining capacities associated with a plurality of terminal devices, wherein the capacities are based on workloads for agents associated with the plurality of terminal devices;
    accessing historical acceptance data for past interaction invitations to user devices associated with one or more criteria;
    accessing current data for current user devices which are currently active in a network, wherein the current data includes associations between the current user devices and the one or more criteria;
    determining a current number of available interactions based on the historical acceptance data and the current data;
    determining that the current number of available interactions is less than a number of the current user devices;
    determining a subset of the current user devices matching the current number of available interactions, wherein determining includes prioritizing the subset using a likelihood of acceptance of a predictive interaction invitation, and wherein the likelihood of acceptance includes the historical acceptance data and the one or more criteria;
    facilitating an interaction between an agent and a current user device in the subset using the predictive interaction invitation; and
    generating updated historical acceptance data using data from the interaction and the historical acceptance data.

2. The method of claim 1, wherein the current data includes real-time data gathered via the network for the current user devices in the network available to receive a targeted interaction invitation.

3. The method of claim 1, wherein determining the current number of available interactions includes:
    providing the capacities for the agents and the current data for the current user devices to a machine learning system trained using the historical acceptance data including the one or more criteria; and
    receiving a value for the current number of available interactions from the machine learning system.

4. The method of claim 3, wherein the machine learning system includes:
    a first neural network trained to determine the value for the current number of available interactions using the historical acceptance data; and
    a second neural network trained to determine a likelihood of acceptance for each device of the current user devices using the historical acceptance data.

5. The method of claim 1 further comprising:
    receiving interaction data for interactions between the agents and one or more user devices;
    accessing updated current data for the current user devices in the network; and
    generating an updated current number of available interaction invitations based on the updated historical acceptance data and the updated current data for the current user devices.

6. A system, comprising:
    one or more data processors; and
    a non-transitory computer-readable storage medium containing instructions which, when executed on the one or more data processors, cause the one or more data processors to perform operations including:
    determining capacities associated with a plurality of terminal devices, wherein the capacities are based on workloads for agents associated with the plurality of terminal devices;
    accessing historical acceptance data for past interaction invitations to user devices associated with one or more criteria;
    accessing current data for current user devices which are currently active in a network, wherein the current data includes associations between the current user devices and the one or more criteria;
    determining a current number of available interactions based on the historical acceptance data and the current data;
    determining that the current number of available interactions is less than a number of the current user devices;
    determining a subset of the current user devices matching the current number of available interactions, wherein determining includes prioritizing the subset using a likelihood of acceptance of a predictive interaction invitation, and wherein the likelihood of acceptance includes the historical acceptance data and the one or more criteria;
    facilitating an interaction between an agent and a current user device in the subset using the predictive interaction invitation; and
    generating updated historical acceptance data using data from the interaction and the historical acceptance data.

7. The system of claim 6, wherein the current data includes real-time data gathered via the network for the current user devices in the network available to receive a targeted interaction invitation.

8. The system of claim 6, wherein determining the current number of available interactions includes:
    providing the capacities for the agents and the current data for the current user devices to a machine learning system trained using the historical acceptance data including the one or more criteria; and
    receiving a value for the current number of available interactions from the machine learning system.

9. The system of claim 8, wherein the machine learning system includes:
- a first neural network trained to determine the value for the current number of available interactions using the historical acceptance data; and
- a second neural network trained to determine a likelihood of acceptance for each device of the current user devices using the historical acceptance data.

10. The system of claim 6 further comprising:
- receiving interaction data for interactions between the agents and one or more user devices;
- accessing updated current data for the current user devices in the network; and
- generating an updated current number of available interaction invitations based on the updated historical acceptance data and the updated current data for the current user devices.

11. A computer-program product tangibly embodied in a non-transitory machine-readable storage medium, including instructions configured to cause a data processing apparatus to perform operations including:
- determining capacities associated with a plurality of terminal devices, wherein the capacities are based on workloads for agents associated with the plurality of terminal devices;
- accessing historical acceptance data for past interaction invitations to user devices associated with one or more criteria;
- accessing current data for current user devices which are currently active in a network, wherein the current data includes associations between the current user devices and the one or more criteria;
- determining a current number of available interactions based on the historical acceptance data and the current data;
- determining that the current number of available interactions is less than a number of the current user devices;
- determining a subset of the current user devices matching the current number of available interactions, wherein determining includes prioritizing the subset using a likelihood of acceptance of a predictive interaction invitation, and wherein the likelihood of acceptance includes the historical acceptance data and the one or more criteria;
- facilitating an interaction between an agent and a current user device in the subset using the predictive interaction invitation; and
- generating updated historical acceptance data using data from the interaction and the historical acceptance data.

12. The computer-program product of claim 11, wherein the current data includes real-time data gathered via the network for the current user devices in the network available to receive a targeted interaction invitation.

13. The computer-program product of claim 11, wherein determining the current number of available interactions includes:
- providing the capacities for the agents and the current data for the current user devices to a machine learning system trained using the historical acceptance data including the one or more criteria; and
- receiving a value for the current number of available interactions from the machine learning system.

14. The computer-program product of claim 13, wherein the machine learning system includes:
- a first neural network trained to determine the value for the current number of available interactions using the historical acceptance data; and
- a second neural network trained to determine a likelihood of acceptance for each device of the current user devices using the historical acceptance data.

15. The computer-program product of claim 11 further comprising:
- receiving interaction data for interactions between the agents and one or more user devices;
- accessing updated current data for the current user devices in the network; and
- generating an updated current number of available interaction invitations based on the updated historical acceptance data and the updated current data for the current user devices.

* * * * *